United States Patent
Child

(10) Patent No.: US 7,105,765 B2
(45) Date of Patent: Sep. 12, 2006

(54) SYSTEM AND METHOD FOR ALIGNING TUBES IN AN ORBITAL WELDER

(75) Inventor: Kent R. Child, Los Banos, CA (US)

(73) Assignee: Therma Corporation, Inc., San Jose, CA (US)

( * ) Notice: Subject to any disclaimer, the term of this patent is extended or adjusted under 35 U.S.C. 154(b) by 0 days.

(21) Appl. No.: 10/842,208

(22) Filed: May 10, 2004

(65) Prior Publication Data

US 2005/0247686 A1   Nov. 10, 2005

(51) Int. Cl.
*B23K 9/095* (2006.01)
(52) U.S. Cl. .................. 219/60 A; 219/125.11
(58) Field of Classification Search .............. 219/60 A, 219/61, 125.11; 228/9, 44.5, 49.3
See application file for complete search history.

(56) References Cited

U.S. PATENT DOCUMENTS 3,534,199 A  * 10/1970 Downey et al. .......... 219/60 A
5,837,966 A  * 11/1998 Timmons, Jr. ............ 219/60 A
6,559,405 B1 *  5/2003 Mehl ........................ 219/60 A

* cited by examiner

*Primary Examiner*—Clifford C. Shaw
(74) *Attorney, Agent, or Firm*—Henneman & Associates, PLC; Larry E. Henneman, Jr.

(57) ABSTRACT

A novel orbital welder includes a body defining a tube passage, a weld tip, a rotor, a light source disposed to emit light toward the tube passage such that the emitted light will impinge upon one or more tubes placed in the tube passage, and a detector to detect the light emitted by the light source from the tube passage. The intensity of the detected light depends on the position of the tube. The detector can either be disposed to detect light reflected by the tube(s) or light transmitted past the tube(s). A method is also disclosed for aligning tubes in an orbital welder including the steps of emitting light from the light source into the tube passage, monitoring the light from the tube passage with the detector, and providing a signal indicative of the position of the tube(s) based on the intensity of the detected light.

65 Claims, 12 Drawing Sheets

| | Intensity | |
|---|---|---|
| Tube | Reflectance | Transmittance |
| I | ≤ 5% | ≥ 95% |
| II | ~ 50% | ~ 50% |
| III | ≥ 95% | ≤ 5% |
| IV | ~ 80% | ~ 20% |

| Light | | Condition | |
|---|---|---|---|
| A | B | | |
| off | off | ≤ 5% max reflectance | 1202 |
| on | off | 50% (± 2.5%) max reflectance | 1204 |
| on | on | 80% (± 2.5%) max reflectance | 1206 |
| off | on | ≥ 95% max reflectance | 1208 |

1210  1212  1214

1200

SYSTEM AND METHOD FOR ALIGNING TUBES IN AN ORBITAL WELDER

BACKGROUND OF THE INVENTION

1. Field of the Invention

This invention relates generally to orbital welders, and more particularly to a novel alignment system facilitating easy tube alignment within orbital welders.

2. Description of the Background Art

Orbital welders are widely used in the construction of fluid handling systems, for example semiconductor processing equipment. Known orbital welders join metal tubes in an end-to-end fashion by forming a flat, circular weld around the circumference of the tubes' opposing ends. One problem encountered by conventional orbital welders is that the ends of the tubes which are to be joined must be precisely aligned prior to performing the welding operation.

When aligning tubes in an orbital welder, there are several conditions which must be met before the welding operation can begin. First, the seam where the weld will be formed must be aligned with the weld tip to ensure proper bead coverage at the tube interface. Another condition which must be monitored is the alignment of the open ends of the tubes with one another when abutted in the orbital welder. This condition ensures that the mating ends of the tubes are both laterally (axially) aligned and planar (flat) perpendicular to the running directions of the tubes. The final condition required when aligning tubes in an orbital welder is checking the ovality of the mating ends of the tubes to ensure that the mating ends of the tubes are substantially circular.

As a result of these requirements, aligning the mating ends of two tubes within prior art orbital welders has been notoriously time-consuming and/or resulted in a relatively high number of unacceptable welds. For example, it is common for a skilled operator to require a minimum of 5 minutes to align a pair of tubes using such orbital welders. The alignment of tubes is time-consuming because the operator must align the mating ends of the tubes merely by eye, while keeping the above alignment conditions in check. Additionally, the area within the orbital welder where alignment must occur is generally enclosed and not well-illuminated, also hindering the alignment process. Finally, the operator must also prevent external influences, such as the tube clamping process and external vibrations, from upsetting the alignment of the tubes.

FIG. 1 is a top plan view of a typical orbital welder 100, which includes an insulating body 102, tube clamps 104 and 106, a rotor 108, a weld tip 110, and a rotation and voltage controller 112. Clamps 104 and 106 hold tubes 114 and 116, respectively, in position for welding, and are maintained at a common voltage (e.g., ground) and in electrical contact with tubes 114 and 116. Rotor 108 is disposed within body 102 so as to be rotatable about an axis 118 passing through the center of the open ends of tubes 114 and 116. Body 102 provides electrical insulation between rotor 108 and clamps 104 and 106. Rotation and voltage controller 112 functions to rotate rotor 108 within body 102, and to apply a voltage, via rotor 108, to attached weld tip 110.

FIG. 2 shows a cross-sectional view of orbital welder 100, taken along line A—A of FIG. 1. As controller 112 rotates rotor 108 about axis 118 and applies a high voltage to weld tip 110, an arc weld 202 is formed between the open ends of tubes 114 and 116. Because clamps 104 and 106 are held at the common voltage, they must be displaced a safe distance from weld tip 110, so as not to generate an arc there between. The distance between clamps 104 and 106 and the open ends of tubes 114 and 116 makes alignment of the open ends of tubes 114 and 116 more difficult. Moreover, as discussed above, the interior chambers of known orbital welders are dark, and, therefore, visual confirmation of proper alignment is difficult.

What is needed is an orbital welder that facilitates efficient alignment of the tube pieces that are to be welded. What is also needed is an orbital welder that facilitates easy confirmation of proper alignment.

SUMMARY

The present invention overcomes the problems associated with the prior art by providing an orbital welder including a novel alignment system. The invention facilitates efficient alignment of the mating ends of a pair of tubes within the orbital welder.

A novel orbital welder includes a body defining a tube passage, a weld tip, a rotor, a light source disposed to emit light toward the tube passage to impinge on one or more tubes placed in the tube passage, and a detector disposed to detect the light emitted by the light source from the tube passage. The detected light may be transmitted directly from the light source or reflected form one or both of the tubes. In either case, the intensity of the light detected by the detector depends on the position of the tube(s) in the tube passage. In a particular embodiment, the light source includes at least one laser. Optionally, the light source and the detector are embodied in a single unit. The orbital welder also includes at least one clamp to retain the tube in the tube passage. Optionally, the clamp can be operative to automatically engage the tube responsive to a predetermined intensity of detected light.

The intensity of detected light is indicative of several aspects of alignment. In one case, the detected light is indicative of the position of an end of the tube with respect to the weld tip. For example, when the tube placed in the tube passage is aligned with the weld tip, the emitted light will partially impinge upon the mating end of the tube. As another example, the tube defines a Z-axis, and the intensity of the detected light is indicative of the alignment of a second tube with respect to the Z-axis defined by the first tube. As yet another example, the intensity of the detected light is indicative of the ovality of the tube or a second tube abutted with the first tube in the tube passage.

The positions of the light source and the light detector are also adjustable. In one embodiment, the light source is disposed to emit light along a first direction, and the detector is disposed to detect light traveling along a second direction, wherein the first direction and the second direction are adjustable. In another embodiment, the light source is adjustable with respect to the tube passage to focus the emitted light to a particular spot size, for example less than 600 microns, on tubes of various diameters.

In one embodiment, the rotor defines at least one aperture such that the light source can emit light into the tube passage through the rotor. The detector is also disposed to detect light reflected from the tube passage through the aperture in the rotor. Alternatively, the rotor includes a second aperture formed there through, and the detector is positioned to detect light emitted through the second aperture.

In a particular embodiment, the detector detects light reflected off the tube in the tube passage, and in an alternate particular embodiment, the detector is disposed to detect transmitted light that is not blocked by the tube placed in the tube passage. In either case, the orbital welder can include a plurality of light sources, a plurality of detectors, or a plurality of each.

In another particular embodiment, the orbital welder includes an indicator operative to indicate the intensity of the detected light. The indicator is operative to display the intensity of detected light, and in a more particular embodiment, to display a target intensity indicative of a target alignment position of the tube in the tube passage. Optionally, the indicator can be one or more lights (e.g., red and green LEDs), which are driven according to the intensity of the detected light to simply light up when particular alignment conditions are met or not met.

In the reflective system, the indicator is operative to indicate when the intensity of detected light is below a first predetermined level (e.g., less than 5% of an emitted intensity). In addition, the indicator is further operative to indicate when the intensity of detected light is above a second predetermined intensity (e.g., at least 95% of an emitted intensity). The indicator is also operative to indicate when the intensity of the detected has reached a third predetermined intensity (e.g., 50%±2.5% of an emitted intensity) indicative of alignment of a mating end of the tube with the weld tip. The indicator is further operative to indicate when the intensity of detected light has reached a fourth predetermined intensity (e.g., 80%±2.5% of an emitted intensity) indicative of alignment of a mating end of a second tube with the mating end of the first tube, and if one or both of the first and second tubes is/are rotated, the indicator is operative to indicate if the intensity of detected light deviates by more than 20% of the fourth predetermined intensity.

In the transmissive system, the indicator is operative to indicate when the intensity of light is above a first predetermined intensity (e.g., at least 95% of an emitted intensity) indicative of no light impinging upon the tube. Additionally, the indicator is operative to indicate when the intensity of detected light is below a second predetermined intensity (e.g., at most 5% of an emitted intensity) indicative of all the emitted light impinging on the tube. The indicator is also operative to indicate when the intensity of detected light has reached a third predetermined intensity (e.g., 50%±2.5% of an emitted intensity) indicative of alignment of a mating end of the tube with the weld tip. The indicator is further operative to indicate when the intensity of detected light has reached a fourth predetermined intensity (e.g., 20%±2.5%) indicative of alignment of a mating end of a second tube with the mating end of the first tube, and if one or both of the first and second tubes is/are rotated, the indicator is operative to indicate if the intensity of detected light deviates by more than 20% of the fourth predetermined intensity.

A method for aligning one or more tubes in an orbital welder having a tube passage, a light source, and a light detector is also disclosed, and includes the steps of emitting light from the light source into the tube passage, monitoring the light from the tube passage with the detector, and providing a signal indicative of the position of a tube (or a tube fitting) disposed in the tube passage based on the intensity of light monitored by the detector. In one particular method, the step of emitting light from a light source includes emitting light from a laser. In another particular method, the step of monitoring light from the tube passage includes monitoring light reflected off a tube disposed in the tube passage, and in alternate particular embodiment, the step of monitoring light from the tube passage includes monitoring light not blocked by a tube disposed in the tube passage.

In another particular method, the orbital welder includes a rotor defining an aperture there through, and the step of emitting light into the tube passage includes emitting light through the aperture in the rotor. Optionally, the rotor defines a second aperture there through, and the step of monitoring light from the tube passage includes monitoring light not blocked by the tube emanating through the second aperture.

In still another particular method, the orbital welder includes a weld tip, and the step of providing a signal includes providing a signal when the monitored intensity is indicative of a pre-tacked pair of tubes being in alignment with the weld tip.

In another particular method, the orbital welder includes a weld tip, and the step of providing a signal includes providing a signal when the monitored intensity is indicative of a mating end of the tube being in alignment with the weld tip. Additionally, the method includes the step of providing a second signal indicative of a second tube abutting the tube disposed in the tube passage based on the intensity of light monitored by the detector. In still a more particular method, the step of monitoring light from the tube passage includes monitoring light while the second tube is rotated, and providing a third signal if the intensity of the monitored light changes beyond a predetermined range (e.g., ±20% of the second predetermined intensity) while the second tube is rotated.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art by providing an orbital welder including a novel alignment system capable of aligning the mating ends of a plurality of tubes within a tube passage of the orbital welder. In the following description, numerous specific details are set forth (e.g., specific detected intensity percentages, indicator lighting schemes, alignment system component positioning, etc.) in order to provide a thorough understanding of the invention. Those skilled in the art will recognize, however, that the invention may be practiced apart from these specific details. In other instances, well known details of orbital welder design (e.g., rotor drive gearing, operational voltages, etc.) have been omitted, so as not to unnecessarily obscure the present invention.

Figure 1:
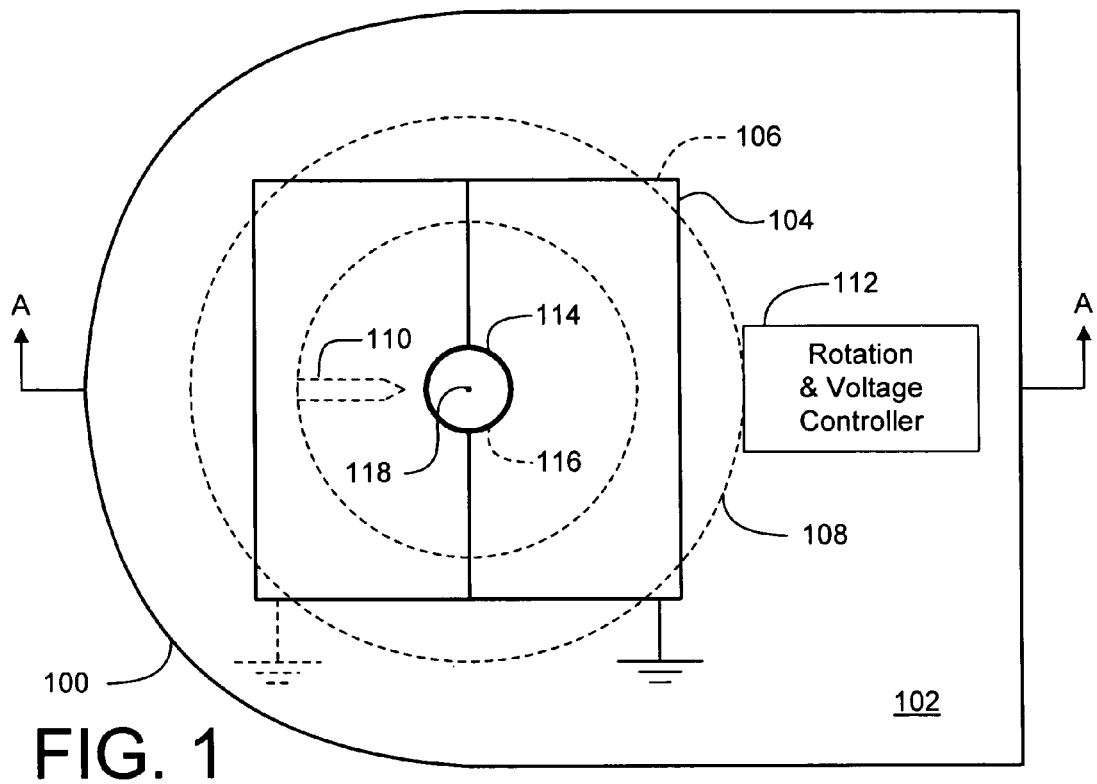
FIG. 1 is a top view of a prior art orbital welder.
Figure 2:
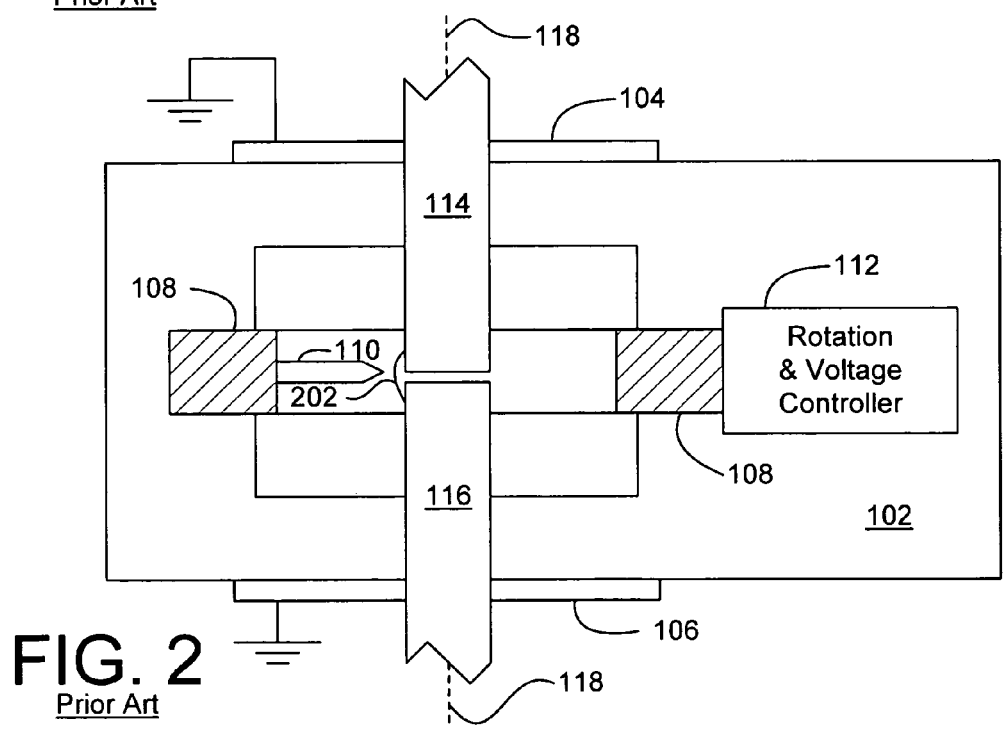
FIG. 2 is a cross-sectional view of the orbital welder of FIG. 1, taken along line A—A.
Figure 3:
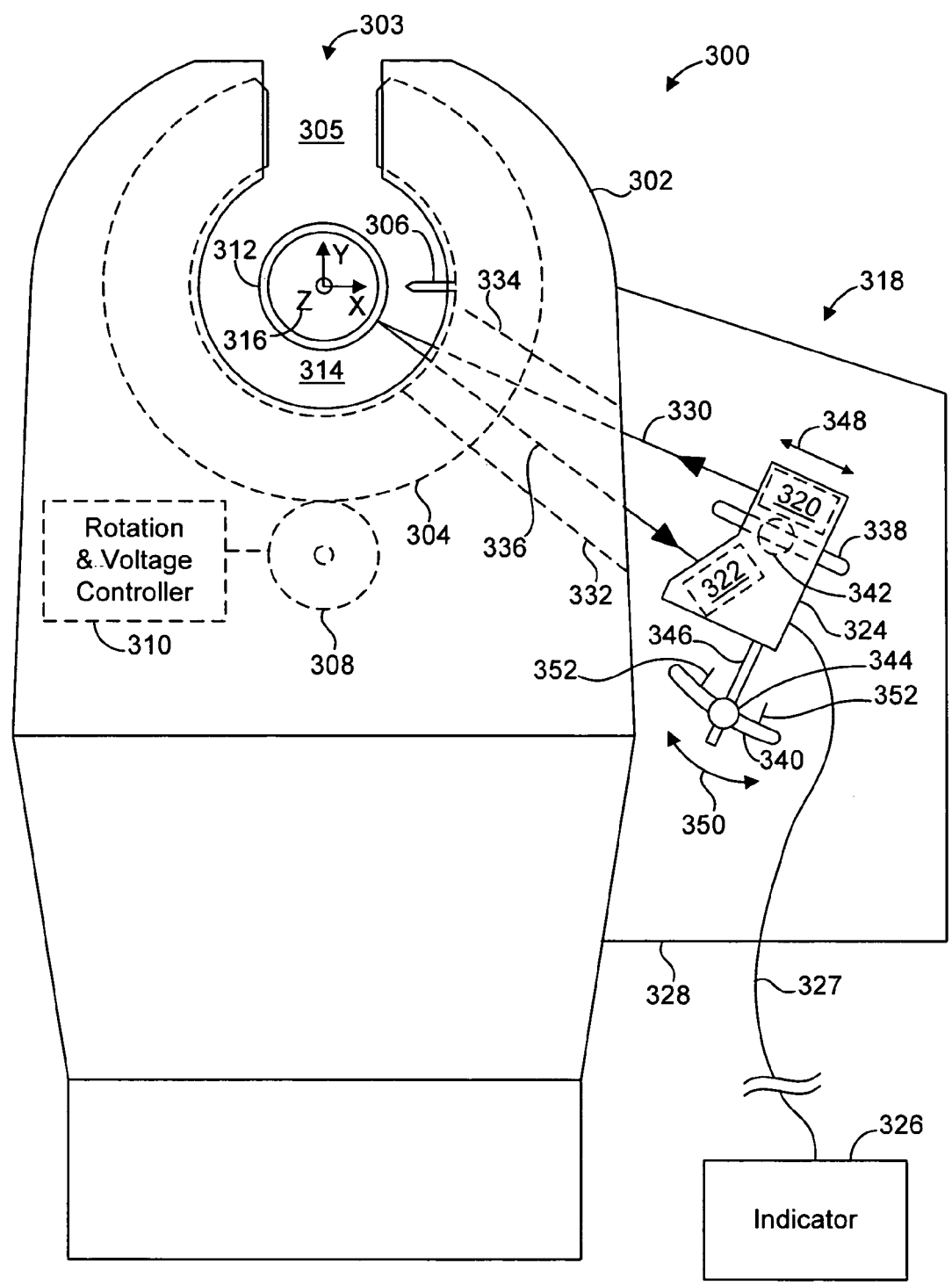
FIG. 3 is a top view of an orbital welder incorporating one embodiment of a reflective tube alignment system of the present invention.

FIG. 3 shows an orbital welder 300 including an alignment system of the present invention. Orbital welder 300 includes an insulating body 302 defining a window 303, a rotor 304 defining an open section 305, a weld tip 306, a drive mechanism 308, and a rotation and voltage controller 310. Orbital welder 300 also includes a plurality of clamps (not shown in the present view for purposes of clarity), which retain portions of the one or more tubes in position within body 302 and maintain the tube(s) at a common voltage (e.g., ground). As shown in FIG. 3, a single tube 312 is retained in a tube passage 314 of body 302.

The components of orbital welder 300 perform the following functions. Body 302 provides electrical insulation between the clamps and weld tip 306, and generally provides a support structure for the other components of orbital welder 300. Rotor 304 is disposed within body 302 so as to be rotatable about a Z axis 316 passing through the center of tube 312 and tube passage 314. When rotor 304 is in a home position, removed section 305 is aligned with window 303 such that an operator of welder 300 can look into tube passage 314. Weld tip 306 is mounted to rotor 304, and when high voltage is applied and rotor 304 is rotated, weld tip 306 is disposed to generate an arc weld at the seam between tube 312 and a second tube (not shown) placed in tube passage 314. Drive mechanism 308 includes a drive and gear train that is controlled by rotation and voltage controller 310, and is disposed to mesh with a toothed outer surface (not shown in this view) of rotor 304 to cause rotor 304 to rotate about Z axis 316 responsive to a signal from controller 310. Rotation and voltage controller 310 functions to rotate rotor 304 within housing 302 by controlling drive mechanism 308, and to apply a voltage, either via rotor 304 or other electrical connection, to weld tip 306. Tube passage 314 is defined by body 302 and rotor 304, and functions to receive two tubes that are to be welded together by weld tip 306. Optionally, tube passage 314 can be adapted to receive a tube fitting (e.g., a T-fitting) to be welded to a run tube or a branch tube.

Orbital welder 300 also includes an alignment system 318, which facilitates proper alignment of tube 312 (and a second tube to be welded to tube 312) within tube passage 314. Alignment system 318 includes a light source 320 and a light detector 322, which are both enclosed within an alignment package 324. Alignment system 318 also includes an indicator 326, coupled to alignment package 324 via a cable 327, and a mounting bracket 328.

Alignment system 318 operates as follows. Light source 320 emits light along a first direction 330 through a passage 332 formed in body 302 and a slot 334 formed through the side of rotor 304 (passage 332 and slot 334 shown in phantom). The light impinges on tube 312 in tube passage 314, is partially reflected, and travels along a second direction 336 through slot 334 of rotor 304 and passage 332 of body 302. Light detector 322 monitors the intensity of light received from tube passage 314 along second direction 336, and provides a signal to indicator 326 indicative of the monitored intensity. Indicator 326 displays the monitored intensity (and optionally the emitted intensity from light source 320) to an operator of orbital welder 300. When a predetermined intensity of detected light is received by detector 322 and indicated by indicator 326, the operator knows tube 312 is properly aligned in tube passage 314.

Mount 328 structurally supports light source 320, light detector 322, and optionally indicator 326, and is coupled to the side of body 302 adjacent passage 332. In this embodiment, mount 328 is a sheet metal bracket manufactured to conform to the shape of body 302. Mount 328 also includes a first alignment slot 338 and a second alignment slot 340 to aid in the adjustment of alignment package 324. Additionally, alignment package 324 includes a first alignment slider 342 and a second alignment slider 344 attached to alignment package 324 via arm 346. Slider 342 passes through first alignment slot 338 from the bottom and engages the underside of alignment package 324. Slider 342 rotatably engages (e.g., by a nut and bolt) alignment package 324 such that alignment package can be tightened against mount 328. Loosening slider 342 allows alignment package to be adjusted toward and away from body 302 in the direction of arrow 348. Similarly, slider 344 passes through arm 346 and slidably engages second alignment slot 340. When slider 342 is loosened, slider 344 can be moved along the arc defined by second alignment slot 340 in the direction of the arrow 350. Slider 344 facilitates the rotation of alignment package 324 into proper position such that light source 320 and light detector 322 can emit and receive light to and from tube passage 314. In the present embodiment, alignment package 324 is situated such that the light emitted along light path 330 is focused to impinge on the outer-diameter of tube 312 as a spot.

A plurality of indicia 352 allow alignment package 324 to be rotated into a plurality of present positions corresponding to various particular diameters of tube 312. Similar indicia can be placed adjacent alignment slot 338 to facilitate easy focusing of light emitted by light source 320 on tube 312.

In this particular embodiment, slider 342 is a round-headed screw adapted to engage a nut seated in alignment package 324. Similarly, slider 344 is also a round-headed screw, and optionally engages a nut located below mount 328 to facilitate snugging against mount 328.

In the present embodiment, alignment package 324 is commercially available from the Keyence Corporation of Osaka, Japan as Digital Laser Optic Sensor, model number LV-H37. The LV-H37 focuses six lasers, positioned radially, to travel along first direction 330. The LV-H37 has one detector, which detects the intensity of the combined reflected laser light.

It should be noted that other light sources and light detectors can be employed in the present invention. For example, fiber optics could be positioned directly in the tube passage along with a detector. As another example, light emitted from a laser diode could be focused using lenses to impinge on tube(s) placed in tube passage 314. The detector, in the simplest case could be a simple photo-voltaic cell.

It should also be noted that in the current embodiment, alignment system 318 is shown as a retrofit to orbital welder 300. In this regard, alignment system 318 can be fitted to many different styles of orbital welders as a simple add-on device with minimal modification to the welder. However, it is also anticipated that in mass production alignment package 324 would be permanently mounted within body 302, and indicator 326 would be permanently mounted to body 302, thereby eliminating the need for mount 328.

Figure 4:
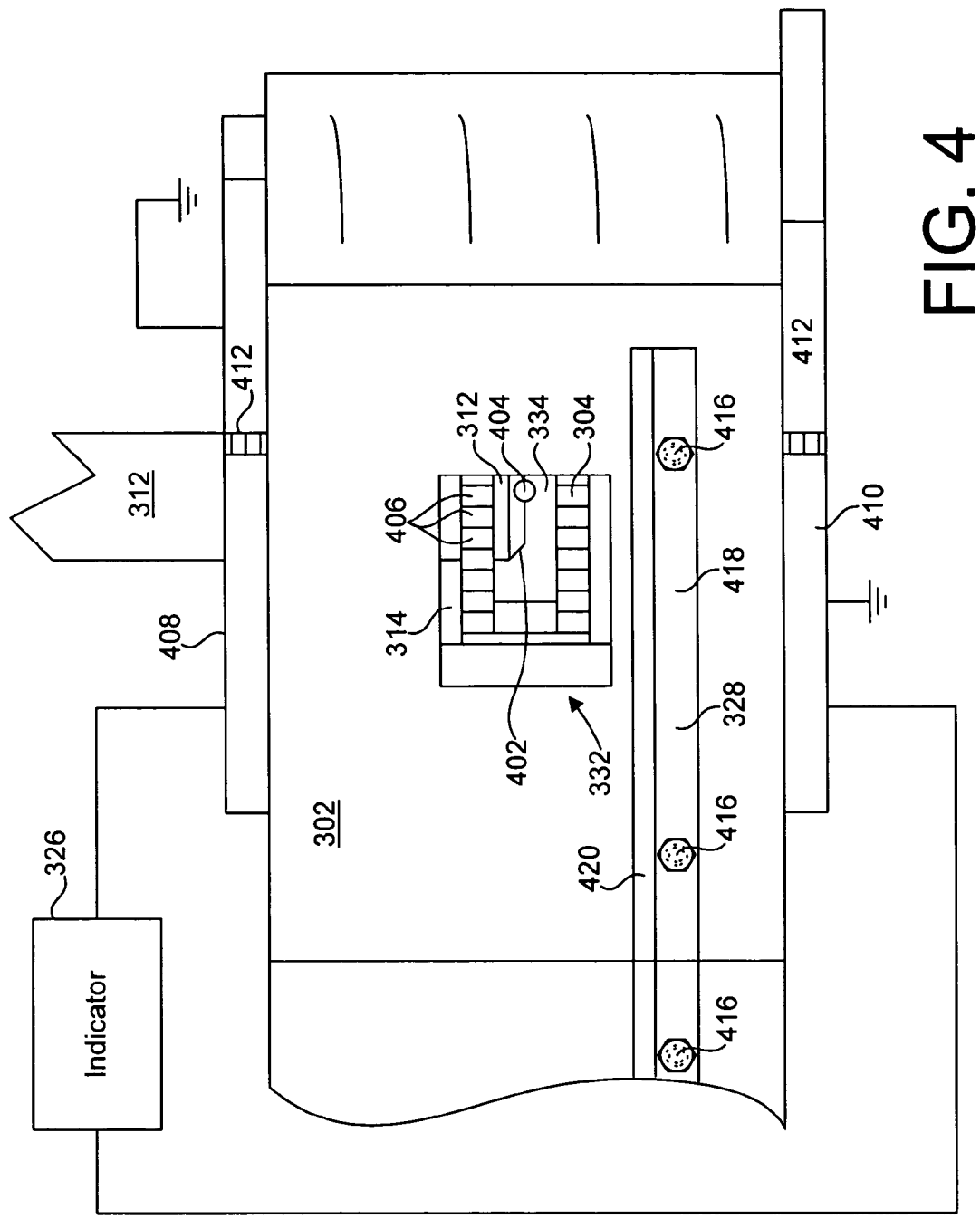
FIG. 4 is a side perspective view looking into the body of the orbital welder of FIG. 3.

FIG. 4 is a side view looking into orbital welder 300 along first direction 330 of FIG. 3 with alignment package 324 removed from view. In FIG. 4, tube 312 is shown extending from outside the top of body 302 down into tube passage 314. Tube 312 is also shown to include a beveled edge 402. A laser spot 404, emitted along first direction 330 by light source 320, is partially impinging upon beveled edge 402 of tube 312.

Rotor 304 is also shown in FIG. 4 to include a plurality of gear teeth 406 arranged around its circumference. Gear teeth 406 mesh with the teeth on gears of drive mechanism 308, causing rotor 304 to rotate when drive mechanism 308 is actuated by rotation and voltage controller 310.

Orbital welder 300 also includes a pair of clamps 408 and 410. Clamps 408 and 410 hold tube 312 and a second tube (not shown), respectively, in position for welding, and are maintained at a common voltage (e.g., ground) and in electrical contact with their respective tube. Each of clamps 408 and 410 are simple collet-style clamps, and each rotate between open and closed positions around a hinge 412. In the present view, clamp 408 is shown in a closed position and clamp 410 is shown in an open position, waiting positioning of a second tube therein.

In a particular embodiment, clamps 408 and 410 operate automatically, responsive to a signal from indicator 326, to clamp a tube (e.g., tube 312) placed there through, when the tube is properly aligned within tube passage 314. For example, indicator 326 is operative to monitor the light intensity detected by light detector 322. Then, responsive to a predetermined intensity indicative of proper alignment of tube 312 in tube passage 314, indicator 326 signals clamp 408 to automatically engage tube 312. Similarly, when a tube was placed in clamp 410, and proper alignment within tube passage 314 was established, indicator 326, responsive to another predetermined intensity of detected light, would signal clamp 410 to engage the tube placed therein.

Optionally, the automatic clamps 408 and/or 410 include an intermediate clamped state. For example, the clamps initially allow substantially unrestricted movement of tube 312 along the z-axis. Then, when the intensity of detected light begins to approach the desired value, the clamp will partially engage ("soft-clamp") tube 312 such that tube 312 can still be manipulated, but not as freely as in the unclamped state. The soft-clamp state makes it easier for the operator to make small changes in the position of tube 312.

Mount 328 is also shown in the present view to be coupled directly to body 302 via a plurality of fasteners 416 (e.g., sheet metal screws, bolts, etc.). In the present embodiment, mount 328 is formed from sheet metal and defines a lip 418, which is bent downward from a platform section 420 to facilitate easy connection of mount 328 to body 302. Platform 420 defines a flat surface to which components of alignment system 318 can be easily mounted.

Optionally, mount 328 can include an encasement (not shown), which would attach to body 302 surrounding passage 332. Such an encasement would shield passage 332 and alignment package 324 from surrounding sources of light, which could interfere with the operation of light source 320 and light detector 322.

Figure 5:
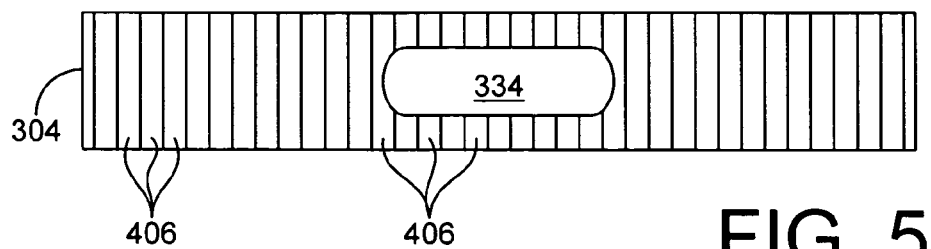
FIG. 5 is a side view of the rotor of FIG. 3.

FIG. 5 shows a side view of rotor 304 removed from orbital welder 300. FIG. 5 clearly shows that rotor 304 includes gear teeth 406 around its outer circumferential edge. In addition, slot 334 is shown formed through the side of rotor 304. In the present embodiment, rotor 304 is constructed from metal. Accordingly, slot 334 can be formed through the side of rotor 304 by methods known in the machining arts. Slot 334 is formed wide enough so that the light emitted from light source 320 can pass unobstructed through rotor 304, and so that light can be reflected from tube passage 314 back through slot 334 to light detector 322. It should also be noted that slot 334 need only be wide enough to not obstruct light emitter 320 and light detector 322 when rotor 304 is located in a home position (e.g., such that slot 334 is aligned with passage 332 in body 102).

Keeping the angle between the first direction 330 and the second direction 336 relatively small minimizes the required size of slot 334. In this particular embodiment, the angle between first direction 330 and second direction 336 is approximately 13 degrees.

Figure 6A:
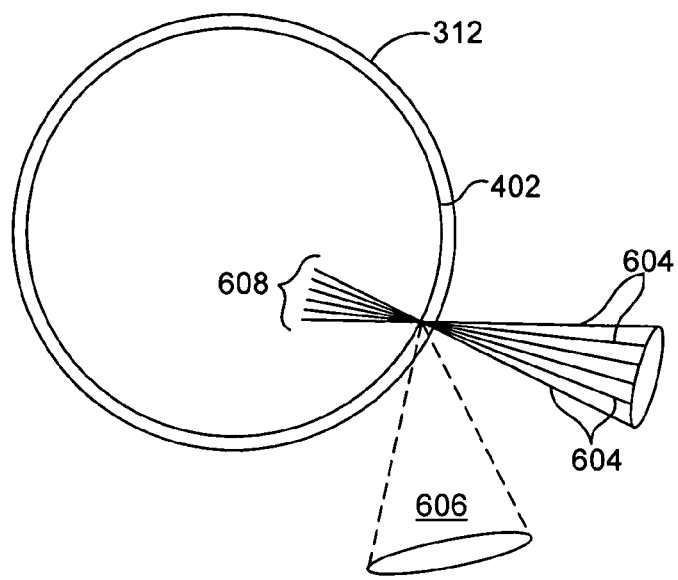
FIG. 6A is a bottom view showing light impinging on a mating end of the tube inserted in the orbital welder of FIG. 1.

FIG. 6A is a bottom view looking along the z-axis (see FIG. 6B) into the mating end of tube 312 in tube passage 314. A plurality of light rays 604 (indicated by solid lines) emitted by light source 320 are partially impinging upon the beveled mating edge 402 of tube 312. A portion of the light rays 604 are reflected off of tube 312 as a reflected beam 606 (indicated by broken lines). The remaining portion 608 of light rays 604, which are not reflected by tube 312, are scattered in the interior of tube 312 or in tube passage 314, and are not detected by light detector 322. The intensity of reflected beam 606 is indicative of the position of the end of tube 602 in tube passage 314.

Figure 6B:
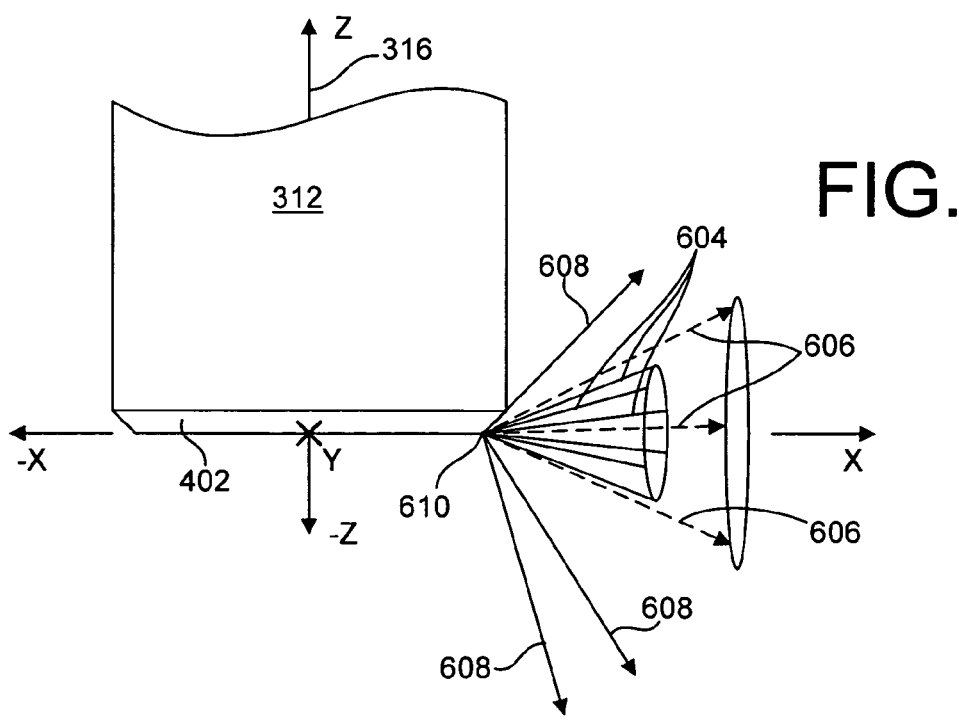
FIG. 6B is a front view showing light impinging on a mating end of the tube inserted in the orbital welder of FIG. 1.

FIG. 6B is a front view of the mating end of tube 312 in tube passage 314. The present view shows that the incident light rays 604 impinge on a shoulder 610 of beveled edge 402 near the inner diameter of tube 312, as shown similarly in FIG. 4. Of the incident light rays 604, approximately half are reflected back to light detector 322, as reflected light rays 606. The remaining rays 604 are scattered as scattered light rays 608, and do not impinge on detector 322.

Alignment with weld tip 306 is achieved because alignment system 318 is disposed to detect when tube 312 breaks the X-Y plane (a plane perpendicular to the plane of the page and passing through the X-axis). Weld tip 306 is also disposed in the X-Y plane, and travels radially around the bevels of mating end 402 of tube 312 to form an arc weld when a second tube is aligned with tube 312. Accordingly, the moment the mating end of tube 312 breaks the X-Y plane, shoulder 610 of bevel 402 is aligned with weld tip 306 at least along Z-axis 316.

The inventor has determined empirically that when a first tube (e.g., tube 312) is properly aligned with weld tip 306, approximately 50% (±2.5%) of the total light intensity emitted by light source 320 is reflected back to light detector 322 from tube passage 314. If tube 312 has not been inserted enough to be impinged upon by light emitted by light emitter 320, the inventor has found that less than 5% of the emitted intensity will be detected. Similarly, if tube 312 is inserted too far into tube passage such that all the light emitted by light source 320 impinges upon tube 312, the inventor has found that the intensity detected by light detector 322 will be at least 95% of the maximum detectable intensity.

In the embodiment shown, the location of the end of tube 312 with respect to the X-Y plane can be precisely determined, because incident rays 604 are focused to a spot of light that is small relative to the dimensions of tube 312. For example, in the embodiment shown, the emitted light is focused to a spot having a diameter of approximately 50 microns (μm), or 0.002 inches. This size is even smaller than the bevel formed on the end of tube 312. If smaller or larger tubes are to be welded, the laser spot size can be adjusted accordingly, depending on the precision required for a particular application.

Figure 6C:
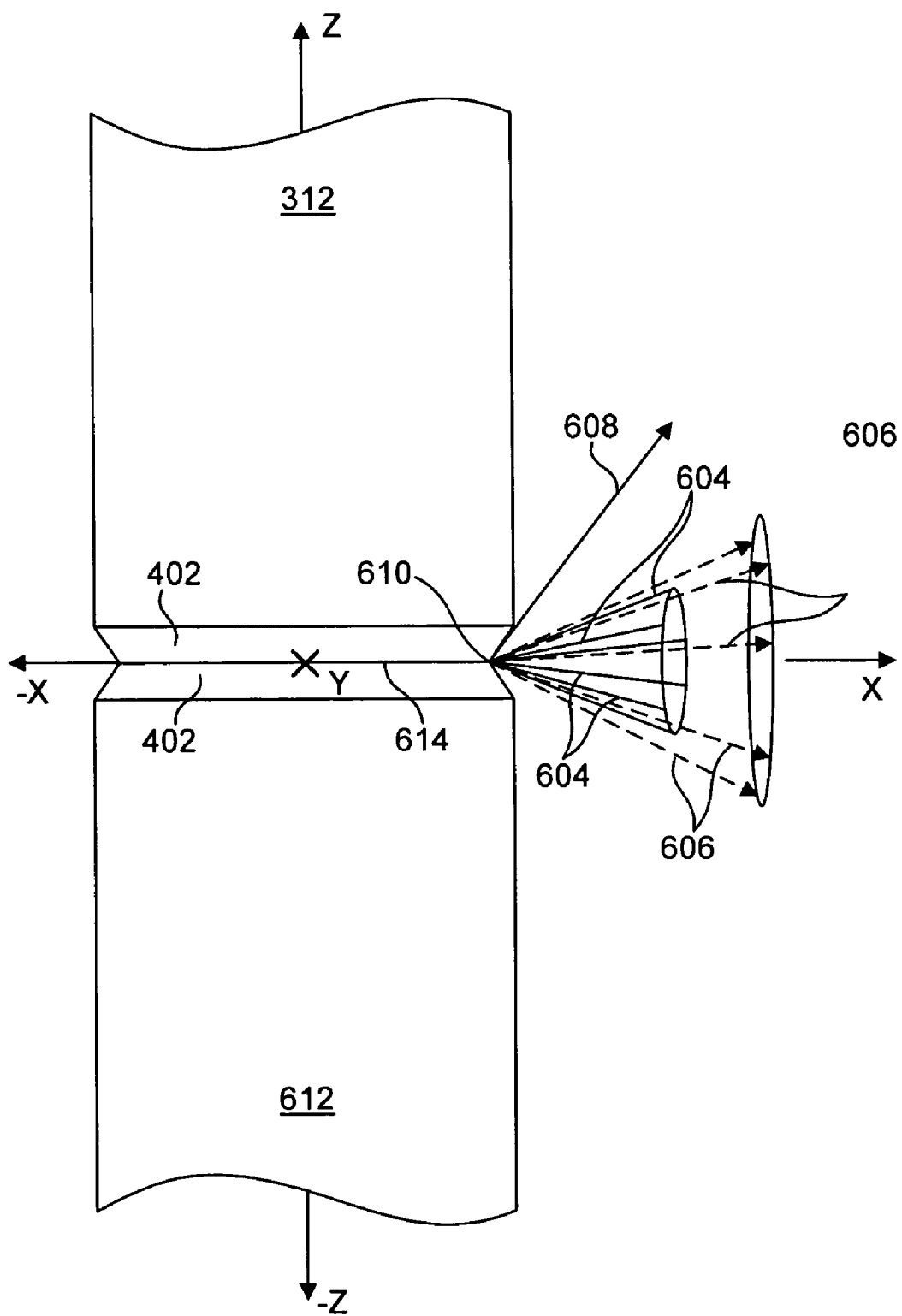
FIG. 6C is a front view showing light impinging on the mating ends of two tubes inserted in the orbital welder of FIG. 1.

FIG. 6C is a front view of a second tube 612 abutting tube 312 in tube passage 314. Like tube 312, second tube 612 also has a beveled edge 402. In the present view, tube 612 is properly aligned with first tube 312. Emitted light rays 604 impinge at a seam 614 between the mating ends of tube 312 and second tube 314. Because there is very little gap between tube 312 and tube 612 at seam 614 when tubes 312 and 612 are properly aligned, most of the emitted light rays 604 are reflected as reflected beams 606, which are received by light detector 322. Only a small portion of the emitted light 604 is scattered, and is indicated by scattered light ray 608.

The present embodiment shows proper alignment of tube 312 and tube 612 in tube passage 314. First, the mating ends of both tube 312 and tube 612 are properly aligned with weld tip 306 because the shoulder 610 of tube 312 and the shoulder of second tube 612 lie approximately within the X-Y plane. Second, both first tube 312 and second tube 612 are laterally aligned with each other along the X-axis and Y-axis. In other words, tube 312 and tube 612 are axially aligned. Third, neither of tube 312 or second tube 612 is out of round.

Each of the above alignment conditions can be verified by the intensity of reflected light detected by light detector 322. As indicated above, first tube 314 is properly inserted and aligned with weld tip 306 when the intensity detected by light detector 322 is approximately 50% (±2.5%) of the maximum reflectance. Note that the maximum reflectance is determined by positioning a clean, round tube completely through the X-Y plane and measuring the reflected light intensity. Then, after first tube 312 is correctly inserted and aligned with weld tip 306, second tube 612 can be inserted into tube passage 314. When second tube 612 is properly aligned with weld tip 306, and the mating ends of tubes 312 and 612 are properly aligned with one another about the Z-axis, the inventor has discovered that the intensity of light detected by light detector 322 is approximately 80% (±2.5%) of the maximum reflectance. Similarly, if tubes 312 and 612 are pre-tacked together before being inserted into tube passage 314, proper alignment of the pre-tacked seam with weld tip 306 is also indicated by light detector 322 detecting approximately 80% (±2.5%) of the maximum reflectance.

As stated previously, because emitted light rays 604 are focused to such a small point, very minute misalignments are indicated by the detected intensity of reflected light. For example, if one of tubes 312 and 612 is misaligned either along the X-axis or Y-axis, the intensity of light detected by light detector 322 will be out of the range of 80% (±2.5%) because a slight ridge will be formed where light rays 604 impinge on seam 614. Similarly, if one of tubes 312 or 612 is skewed into the X-Y, X-Z and/or Y-Z planes, the detected intensity will also be out of the range 80% (±2.5%), because a small gap will be formed at the point where light rays 604 impinge on seam 614.

The ovality of tubes 312 and 612 can also be determined by monitoring the intensity of reflected light 606 when tube 312 and/or tube 612 are rotated. For example, after a welder inserts second tube 612 into tube passage 314 and determines that the intensity of detected light was approximately 80% (±2.5%) of the maximum reflectance, the welder then rotates second tube 612 and monitors the intensity of detected light (e.g., via indicator 326) for a substantial deviation in the detected intensity. The inventor has determined that if, during rotation of the second tube, the intensity of light detected by light detector 322 deviates by more than (±20%) of the original value (e.g., 80%), then the mating end of either tube 312 or tube 612 could be out-of-round. If, upon further investigation, it is determined that neither tube 312 nor second tube 612 is out-of-round, then such a deviation in detected light intensity would indicate that one or both of tubes 312 and 612 is misaligned in one or more of the X-Y, X-Z or Y-Z planes.

As stated previously, when tube 312 is inserted into tube passage 314 beyond weld tip 306, the light detected by light detector 322 will be at least 95% of the maximum reflectance, because all of the emitted light 604 would be impinging on the outer surface of tube 312. Contrast this with the 80% of maximum reflectance detected when second tube 612 is inserted into tube passage 314 to abut tube 312. The difference in values between these two cases is due to seam 614, which is created when the mating ends of tubes 312 and 612 are abutted. Seam 614 reduces the detectable intensity of reflected light, because seam 614 will scatter more of the emitted light 604 than will the smooth outer surface of tube 312.

It should be noted that the specific values outlined above are only representational values. Indeed, depending on the components used to construct the orbital welder and the alignment system of the present invention, as well as the physical properties of the tubes being welded, the reflectance percentages outlined above indicating particular states of alignment may vary. It is anticipated by the inventor that each orbital welder incorporating the present alignment system will have to undergo a calibration process to determine maximum reflectance and the percentages of maximum reflectance corresponding to the various alignment conditions.

The calibration process is accomplished as follows. First, the alignment system is powered, and the detected intensity measured with no tube in tube passage 314. This measurement provides an intensity indicative of no light impinging on a tube placed in tube passage 314. Second, a tube is placed in tube passage such that all the light emitted from light source 320 impinges on the side wall of the tube, thereby yielding an intensity indicative of a tube being inserted too far into tube passage 314. Third, a tube must be aligned with weld tip 306 such that it just lies in the X-Y plane, and is coaxial with the Z-axis 316. Then a third intensity reading indicative of a single tube (e.g., tube 312) aligned with weld tip 306 can be measured. Finally, the last calibration step includes inserting a pair of pre-aligned tubes into tube passage 314, and manually aligning the seam with weld tip 306, and verifying that the tubes are properly situated along Z-axis 316. Then an intensity reading indicative of a pair of tubes properly aligned with weld tip 306 can be taken. Advantageously, "standard" tubes that are known to have the desired physical characteristics are used in the calibration process.

It should be noted that the calibration process can be carried out in either light-field or dark-field modes. In light field mode, the calibration process occurs under ambient lighting conditions, such that any interference from the ambient light would be eliminated by the calibration process (i.e., the only concern is the change in intensity with respect to predefined points, and not the intensity values themselves). In dark field mode, the calibration process occurs with no or minimal ambient lighting conditions. Dark field mode calibration is well suited for an alignment system that is generally enclosed within the orbital welder.

Figure 7:
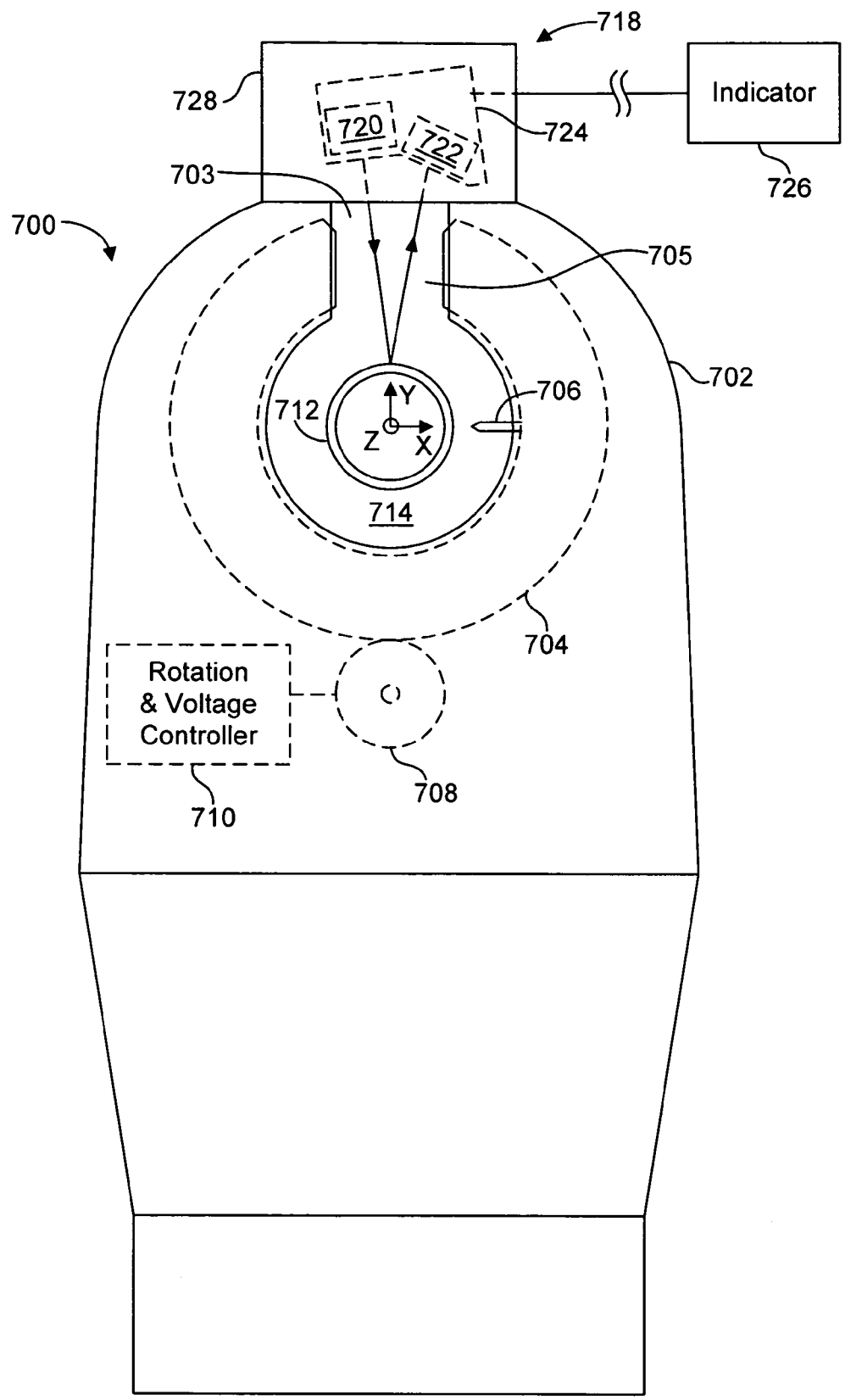
FIG. 7 is a top view of an orbital welder including another embodiment of a reflective tube alignment system of the present invention.

FIG. 7 shows a top view of an orbital welder 700 including an alternate embodiment of an alignment system of the present invention. Similar to orbital welder 300, orbital welder 700 includes an insulating body 702 defining a window 703, a rotor 704 defining an open section 705, a weld tip 706, a drive mechanism 708, and a rotation and voltage controller 710. Orbital welder 700 also includes a plurality of clamps (not shown in the present view for purposes of clarity), which retain one or more tubes within body 702 and maintain the tube(s) at a common voltage (e.g., ground). As shown in FIG. 7, a single tube 712 is retained in a tube passage 714 of body 702. Orbital welder 700 operates similarly to orbital welder 300 of FIG. 3.

Orbital welder 700 also includes an alignment system 718, which facilitates proper alignment of tube 712 (and a second tube to be welded to tube 712) within tube passage 714. Alignment system 718 includes a light source 720 and a light detector 722, which are both enclosed within an alignment package 724. Alignment system 718 also includes an indicator 726 for indicating the intensity of light detected by light detector 722. Alignment system 718 operates substantially similar to alignment system 318 of FIG. 3.

Orbital welder 700 also includes a mount 728, which is coupled to body 702 adjacent window 703. Alignment package 724 is coupled to mount 728 by methods similar to those described above with respect to FIG. 3. Additionally, alignment package 724 is shown in phantom, because mount 728 completely encases alignment package 724. Although not explicitly shown, alignment package 724 is adjustable using methods similar to those disclosed in the embodiment of FIG. 3.

This embodiment provides several advantages, but at least one disadvantage. First, by mounting alignment system 718 adjacent window 703 in body 702, passages through the body 702 and rotor 704 (e.g., passage 332 through body 302 and slot 334 through rotor 304), which would otherwise need to be formed, are not required. In addition, orbital welder is a more compact unit, than orbital welder 300. Further, alignment system 718 can be adapted to mount to hinges and latches (not shown) that are provided in conventional orbital welders for a hinged window cover. The primary disadvantage of orbital welder 700 is that alignment system 718 blocks window 703, thereby hindering the view of the operator into tube passage 714. However, alignment system 718, as well as alignment system 318, eliminates the need to visually align tubes, and it is expected that welders will become comfortable with and readily accept this embodiment once its reliability is demonstrated.

Figure 8:
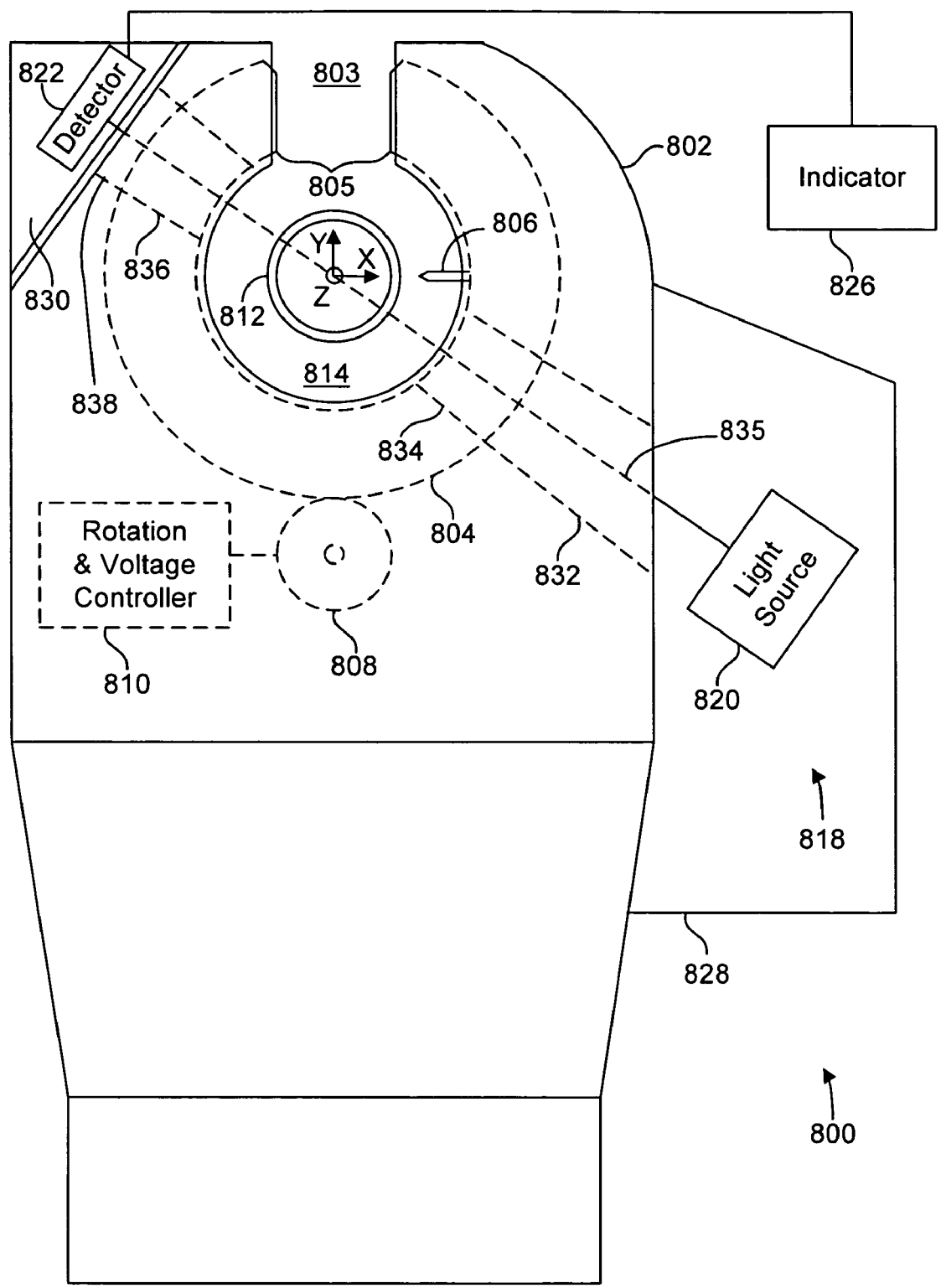
FIG. 8 is a top view of an orbital welder including one embodiment of a transmissive tube alignment system of the present invention.

FIG. 8 shows a top view of an orbital welder 800 including an alternate alignment system 818 of the present invention. Orbital welder 800 includes an insulating body 802 defining a window 803 there through, a sectioned rotor 804 having an open section 805, a weld tip 806, a drive mechanism 808, and a rotation and voltage controller 810. Orbital welder 800 also includes a plurality of clamps (not shown in the present view for purposes of clarity), which retain one or more tubes within body 802, in addition to maintaining the tube(s) at a common voltage (e.g., ground). As shown in FIG. 8, a single tube 812 is retained in a tube passage 814 of body 802. Orbital welder 800 operates similarly to orbital welder 300 of FIG. 3.

Alignment system 818 facilitates proper alignment of tube 812 (and a second tube to be welded to tube 812) within tube passage 814 and includes a light source 820, a light detector 822, and an indicator 826 for indicating the intensity of light detected by light detector 822. Light source 820 and light detector 822 are each coupled to body 802 via one of mounts 828 and 830, respectively. Alignment system 818 operates similarly to alignment system 318 of FIG. 3, except that light detector 822 detects the intensity of light that is transmitted past tube 812, rather than reflected off of the tube as in alignment system 318.

Alignment system 818 operates as follows. Light source 820 emits light through a passage 832 formed in body 802 and a slot 834 formed through one side of rotor 804 (both shown in phantom) along light path 835. Some of the light emitted by light source 820 impinges on tube 812 in tube passage 814, while the remaining light not impinging on tube 812 passes by tube 812 and travels through a second slot 836 in the other side of rotor 804 and through a second passage 838 formed through body 802, before impinging on light detector 822. Light detector 822 monitors the intensity of light received from tube passage 314, through passages 836 and 838, and provides a signal to indicator 826 indicative of the monitored intensity. Indicator 826 displays the monitored intensity to an operator of orbital welder 800. When a predetermined intensity of detected light is received by detector 822 the operator of welder 800 knows tube 812 is properly aligned in tube passage 814.

The intensity values indicative of proper tube alignment with alignment system 818 are roughly inverted as compared to those described with reference to FIG. 6C above. For example, when no light is impinging on tube 812, approximately 95% or more of the maximum transmittance 820 will be detected by detector 822. In contrast, when tube 812 is inserted too far into tube passage 814, such that all the emitted light impinges thereon, light detector 822 will detect approximately 5% or less of the maximum transmittance. If tube 812 is properly aligned within tube passage 814 (e.g., has just broken the X-Y plane), then the intensity of the transmitted light detected by detector 822 will be approximately 50% (±2.5%) of the maximum transmittance. When, a second tube is placed in tube passage 814 and properly aligned with tube 812, the intensity of transmitted light monitored by detector 822 will be approximately 20% (±2.5%) of the maximum transmittance. Similar to the reflective system described with reference to FIGS. 3–7, when the second tube placed in tube passage 814 is rotated, any deviation in the monitored intensity value greater than (±20%) of the value indicative of proper alignment of two tubes (e.g., 20%) will indicate that tube 812, or the second tube placed in tube passage 814 is out-of-round or skewed within tube passage 814.

In the present embodiment, mounts 828 and 830 are simple brackets formed from sheet metal, and are attached to body 802 with fasteners (not shown), similar to the manner in which mount 328 is shown attached to body 302 in FIG. 4. Depending on the requirements of light source 820 and light detector 822, mounts 828 and 830 can include portions to encase light source 820 and detector 822 to protect against interference from ambient lighting. It should also be noted that a portion of body 802 is flat to allow easy attachment of mount 830 thereto.

As shown in the present embodiment, both light source 820 and light detector 822 are fixed to the outside of body 802 via mounts 828 and 830, respectively. However, it is anticipated that in future production of orbital welder 800, both light source 820 and light detector 822 will be permanently placed within body 802, with any adjustment features for adjusting either light source 820 or light detector 822 accessible to the operator outside of body 802 (e.g., via adjustment levers, an electronic interface panel, etc.).

It should also be noted that the particular placement of light source 820 and light detector 822 can be altered as required to accommodate other elements (e.g., drive gears) of welder 800. For example, light source 820 and detector 822 can be moved depending on the geometry of body 802. As another example, detector 822 could be mounted within the inner circumference of rotor 804 opposite light source 820, thereby eliminating the need for second slot 836 in rotor 804, and second passage 838 through body 802.

Light source 820 can also be configured to emit a single beam of light or emit a plurality of beams of light. While multiple alignment specifications can be detecting using a single light beam, using a plurality of light beams would more readily indicate the nature of tube misalignment. For instance, by employing a light source 820 that projects a plurality of parallel light beams in a plane parallel to the Z-axis, one could monitor the progression of the mating end of a tube, as it is being inserted into tube passage 814, toward weld tip 806. As another example, a plurality of parallel beams in the X-Y plane would be useful to monitor the planarity of the end of a tube.

Figures 9, 10:
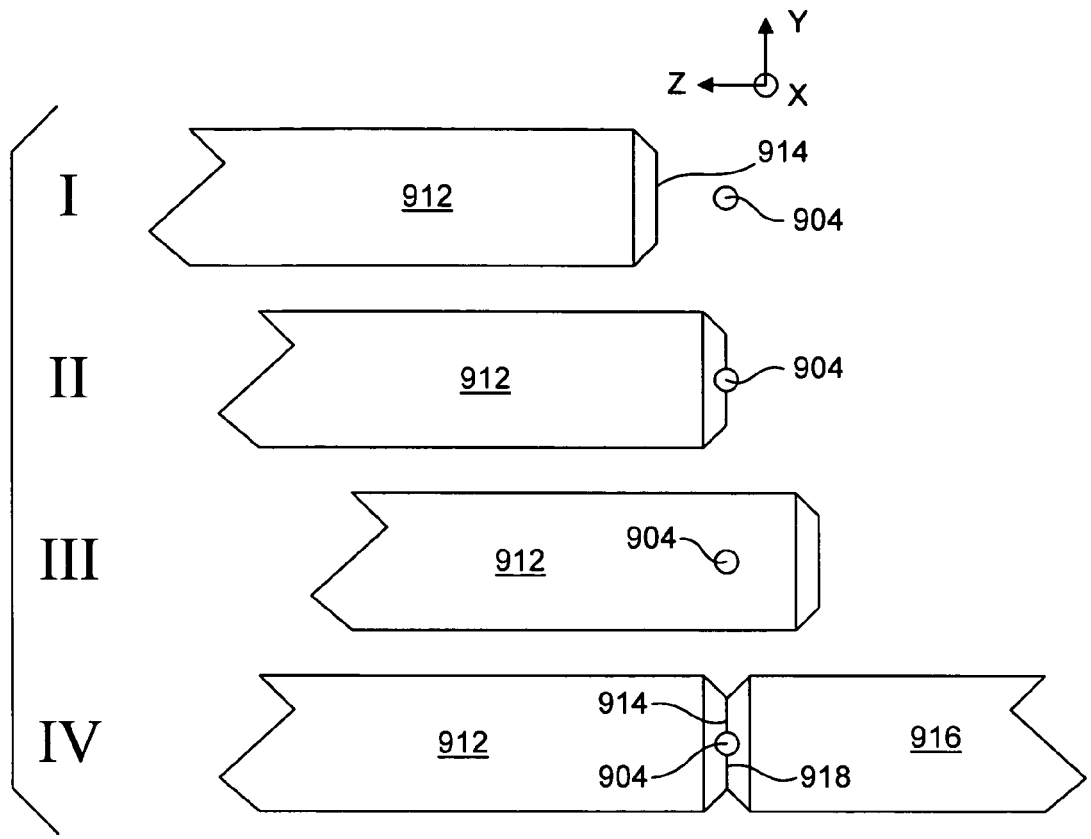
FIG. 9 shows a pipe in a plurality of positions being impinged upon by a light source of the alignment system of the present invention.
FIG. 10 is a table displaying example detected light intensities for the tube positions of FIG. 9 for both transmissive and reflective alignment systems of the present invention.

FIG. 9 shows a tube 912 in three different positions (I–III) with respect to an emitted light beam 904, and abutting another tube 916 (IV). Light beam 904 is focused to intersect the X-Y plane at the same position that a mating end 914 of tube 912 should intersect the X-Y plane.

In the first position (I), tube 912 has not been inserted far enough for light beam 904 to impinge upon it, nor for mating end 914 to be aligned with the weld tip. Thus, there will be minimum reflectance and maximum transmittance. In the second position (II), tube 912 has been inserted half way into light beam 904, and is therefore aligned with the weld tip. In this position, there will be approximately 50% of maximum reflectance and transmittance. In the third position (III), tube 912 has been inserted past light beam 904 and therefore, past the weld tip. In this position, there will be maximum reflectance and minimum transmittance. In the fourth position (IV), tube 912 and second tube 916 are both positioned half way into light beam 904. In position (IV) tube 912 and second tube 916 are aligned and ready to be welded together. In this position, there should be roughly 80% of maximum reflectance and roughly 20% of maximum transmittance.

FIG. 10 shows a table 1000 having a plurality of rows 1002, 1004, 1006, and 1008, and a plurality of columns 1010, 1012, and 1014. Rows 1002, 1004, 1006, and 1008 correspond to position (I) through position (IV) of FIG. 9, respectively. Column 1010 identifies the position number (I–IV) of tube 912 with respect to light beam 904. Column 1012 displays percentage values of reflected light monitored by a detector (e.g., light detector 322) for each tube position in an orbital welder incorporating a reflective alignment system of the present invention. Column 1014 displays percentage values of transmitted light monitored by a detector (e.g., light detector 822) for each tube position in an orbital welder incorporating a transmissive alignment system of the present invention.

The intensity percentages for each tube are as follows. For a tube in position (I), a detector adapted to detect light reflecting off tube 912 would detect approximately 5% or less of the maximum reflectance, because light beam 904 is not impinging upon tube 912. In contrast, in a transmissive system, 95% or more of the maximum transmittance would be detected. If tube 912 is position (II), then in both a reflective and transmissive system, approximately 50% of the respective maximum reflectance and maximum transmittance would be detected, because approximately half of light beam 904 is impinging on tube 912. When tube 912 is in position (III), 95% or greater of the maximum reflectance is detected in a reflective system, while approximately 5% of the maximum transmittance is detected in a transmissive system, due to light beam 904 totally impinging on tube 912. In position (IV), when mating end 914 of tube 912 is aligned and abutted with a mating end 918 of second tube 916, and light beam 904 is impinging on the seam formed between tube 912 and second tube 916, approximately 80% of the maximum reflectance will be detected in a reflective system, and approximately 20% of the maximum transmittance will be detected in a transmissive system.

One might notice some abnormalities in intensity and reflectance values shown in table 1000. For instance, for a tube in position (I), one might expect that no light would be reflected back to the detector in a reflective system, or that in a transmissive system all the light would be detectable. The slight deviations from these ideal values are caused by interference of the light with the orbital welder. For instance, for a tube in position (I), a portion of light beam 904 might be scattered in tube passage 314 of body 302, or slot 334 in rotor 304, thereby becoming detectable in the reflective case, or undetectable in the transmissive case. Similarly, with position (IV), although all of light beam 904 is impinging on the seam between tube 912 and second tube 916, some of the light may be transmitted through the seam, or reflected off the beveled mating ends 914 and 918 of tubes 912 and 916. Further, the reflectance of light off of tubes 912 and 916 will depend on the material and surface condition of tubes 912 and 916.

Accordingly, depending on the particular setup of the orbital welder and alignment system, deviation from the percentages provided as examples in table 100 is expected, and values corresponding to the tube positions shown in FIG. 9 and others will be established during the calibration and setup of the orbital welder and alignment system.

Figures 11, 12:
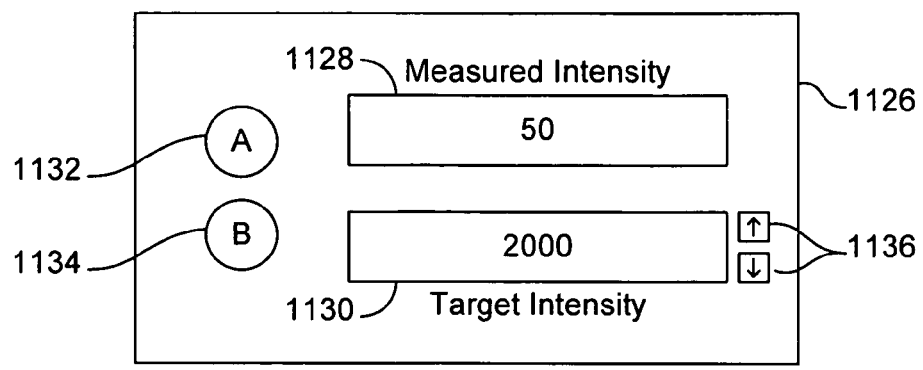
FIG. 11 shows one embodiment of an indicator for use with the alignment systems of the present invention.
FIG. 12 is a table displaying possible indicator modes of the indicator of FIG. 10 depending on the position of a tube in an orbital welder of the present invention.

FIG. 11 shows an indicator 1126 for use with an orbital welder of the present invention. Indicator 1126 is one possible embodiment of indicator 326 (FIG. 3), indicator 726 (FIG. 7), or indicator 826 (FIG. 8). Indicator 1126 includes a measured intensity field 1128, a target intensity field 1130, a first indicator light 1132, a second indicator light 1134, and a plurality of selector keys 1136.

The components of indicator 1126 function as follows. Measured intensity field 1128 displays the intensity of light monitored by a light detector (e.g., one of light detectors 322, 722, and 822). Target intensity field 1130 displays a target intensity indicative of proper alignment of one or more tubes within a tube passage of an orbital welder of the present invention. An operator of the orbital welder is able to input or select target intensity values by using selector keys 1136. Finally, indicator lights 1132 and 1134 function as a two-bit visual indicator of the state of alignment of one or more tubes in the orbital welder. The specific operation of indicator lights 1132 and 1134 will be described hereinafter.

However, one should note that indicator 1126 is exemplary in nature, and it should be understood that various modifications to indicator 1126 are possible. For example, although indicator 1126 is shown in FIGS. 3, 7, and 8 as detached from the orbital welders of the present invention, indicator 1126 could be incorporated in the body of the orbital welder. As another example, indicator 1126 could include a keypad to enter intensity data, or a connector for connecting the indicator to an external device, such as a computer to enter or monitor intensity data. As yet another example, indicator 1126 could be fitted with a bar monitor to display the measured intensity value with respect to the target intensity value. As yet another example, monitor 1126 can be provided with calibration programming and an I/O device to enable indicator 26 to capture and store calibration values (e.g., maximum reflectance, maximum transmittance, minimum reflectance, minimum transmittance, reflectance and/or transmittance percentages for properly aligned standards, etc.).

FIG. 12 shows a table 1200 describing a 2-bit lighting scheme for indicator lights 1132 and 1134 of indicator 1126. Table 1200 includes a plurality of rows 1202, 1204, 1206, and 1208, each associated with a respective one of four different lighting modes of indicator lights 1132 and 1134. Table 1200 also includes a plurality of columns 1210, 1212, and 1214. Column 1210 displays, for each of rows 1202 through 1208, whether or not indicator light "A" 1132 is "on" or "off." Similarly, column 1212 displays, for each of rows 1202 through 1208, whether or not indicator light "B" 1134 is "on" or "off." Finally, column 1214 displays a plurality of conditions (percentage of maximum reflectance detected), each associated with one of rows 1202–1208, and an associated lighting mode of indicator lights 1132 and 1134.

Row 1202 corresponds to a first lighting mode in which lights "A" 1132 and "B" 1134 are both off. When both of indicator lights 1132 and 1134 are off, 5% or less of the maximum reflectance is being received by the light detector (e.g., light detector 322). The first indicator mode associated with row 1202 is indicative of no tube (e.g., tube 312) being inserted in the tube passage (e.g., tube passage 314) of the orbital welder (e.g., orbital welder 300), or the tube not being inserted far enough into the tube passage for light to impinge upon it.

Row 1204 corresponds to a second lighting mode in which light "A" 1132 is on and light "B" 1134 is off. When indicator light 1132 is illuminated and indicator light 1134 is off, approximately 50% (e.g., 50%±2.5%) of the maximum reflectance is being received by the light detector. This lighting mode is indicative of a mating end of a tube properly aligned with a weld tip (e.g., weld tip 306) of the orbital welder.

Row 1206 corresponds to a third lighting mode in which lights "A" 1132 and "B" 1134 are on. When both of indicator lights 1132 and 1134 are on, more than 64% (e.g., 80%–16%) of the maximum reflectance is being received by the light detector. This lighting mode is indicative of the mating end of a second tube (e.g., tube 612) abutting the mating end of the first tube in the tube passage.

Finally, row 1208 corresponds to a fourth lighting mode in which light "A" 1132 is off and light "B" 1134 is on. When indicator light 1132 is off and indicator light 1134 is on, 95% or more of the maximum reflectance is being received by the light detector. The lighting mode associated with row 1208 is indicative of a tube being inserted too far into the tube passage (e.g., past the weld tip), or a seam of two tubes not aligned with the weld tip.

As discussed previously, rotating the second tube when abutted with the first tube and monitoring the detected intensity will determine if one of the tubes is out-of-round, or skewed within the tube passage. The present lighting scheme indicates (e.g., by a mode change or by a separate indicator light not shown) that one of the tubes is out-of-round if the detected intensity deviates by more than 15% of the maximum reflectance when one of the tubes is rotated. As discussed above with respect to FIG. 6C, a detected intensity of 80% (±2.5%) of the emitted intensity is indicative of proper alignment of a pair of tubes. Accordingly, the lighting scheme will indicate whether or not the detected intensity remains within the range of 65%–95% of maximum reflectance.

As an example, the operator of orbital welder 300 would use the lighting scheme shown in table 1200 in conjunction with indicator 1126 to align tube 312 and second tube 612 within tube passage 314 as follows. After powering and initializing orbital welder 300 and alignment system 318, the operator of welder 300 slowly inserts tube 312 into tube passage 314 until light "A" 1132 illuminates. Once light "A" 1132 is on, the operator clamps tube 312 in place by engaging clamp 408, making sure light "A" 1132 remains on. Next, the operator inserts second tube 612 into tube passage 314 and abuts the mating end of tube 612 with the mating end of tube 312. If the alignment of second tube 612 with tube 312 is within the acceptable range (e.g., 80%±2.5%), then light "B" 1134 will illuminate. If light "B" 1134 does not illuminate, then first tube 312 and/or second tube 612 must be adjusted, refaced, or replaced with a new tube. Next, the operator would "soft clamp" second tube 612 with clamp 410 such that second tube 612 is retained in position, but can still rotate. The operator would then rotate second tube 612. If the detected reflectance departs the range 65%–95% (as indicated by a light mode change or a separate indicator light), then second tube 612 (or possibly tube 312) must be adjusted or replaced, because second tube 612 (or tube 312) is out of round or skewed in tube passage 314. If no such deviation occurs, the operator can permanently clamp second tube 612 with clamp 410 and energize orbital welder 300 such that tube 312 and second tube 612 are welded together.

It should be noted that although the lighting scheme described in FIG. 12 is for a reflective alignment system such as the embodiments shown in FIGS. 3–7, the lighting scheme of FIG. 12 could easily be adjusted for transmissive alignment systems such as the embodiment shown in FIG. 8.

Figure 13:
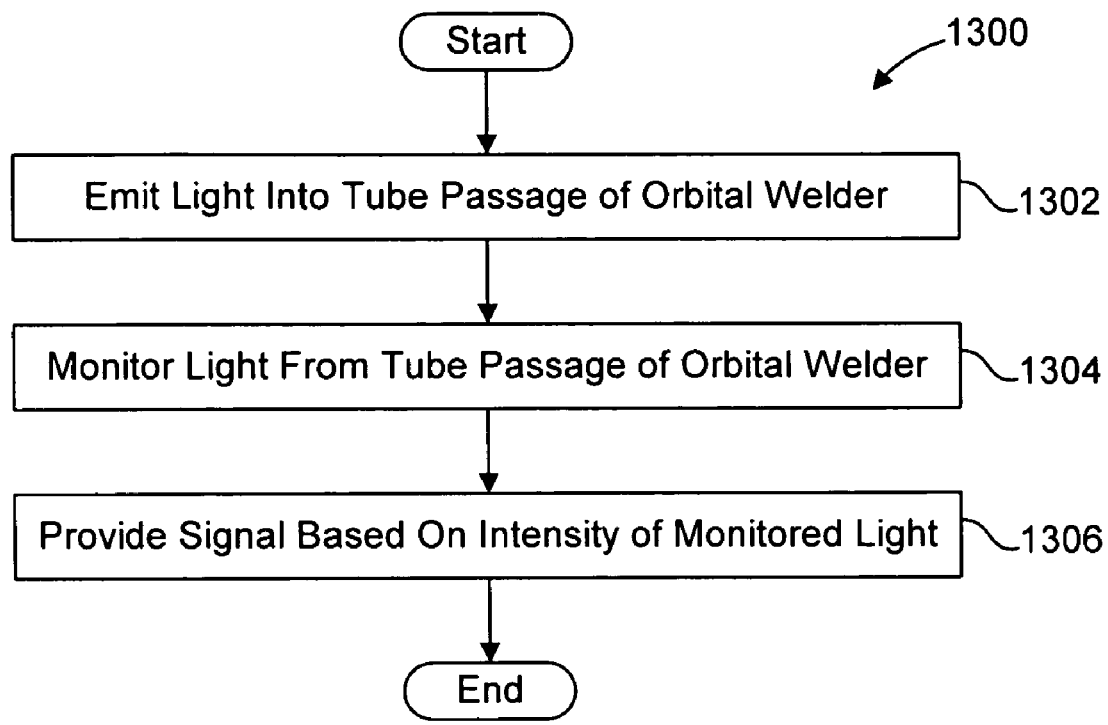
FIG. 13 is a flowchart summarizing one method of aligning at least one tube in an orbital welder of the present invention.

FIG. 13 is a flowchart summarizing one method 1300 for providing a signal used to align one or more tubes in an orbital welder according to the present invention. In a first step 1302, light is emitted from light source 320 into tube passage 314. Then, in a second step 1304, light is monitored from tube passage 314 by light detector 322. Finally, in a third step 1306, indicator 326 provides a signal based on the intensity of light monitored from tube passage 314 by light detector 322.

The signal provided by indicator 326 is indicative of a tube's position within tube passage 314. For instance, a signal could be provided if the monitored intensity is indicative of no tube in tube passage 314. A signal could also be provided if the monitored intensity is indicative of the end of tube 312 being inserted past the weld tip 306 and/or the end of tube 312 being aligned with weld tip 306. As other examples, a signal could be provided if the monitored intensity is indicative the end of tube 312 not lying in the same plane as the plane weld tip 306 circumnavigates, or if the monitored intensity is indicative of the end of tube 312 being out-of-round. The example signals provided are not intended to be exhaustive list of possible signals.

Although method 1300 is described with reference to the elements of FIG. 3, method 1300 is equally applicable to the alternate embodiments of the invention described in FIGS. 7 and 8 and, indeed, any orbital welder capable of performing the steps of method 1300.

Figure 14:
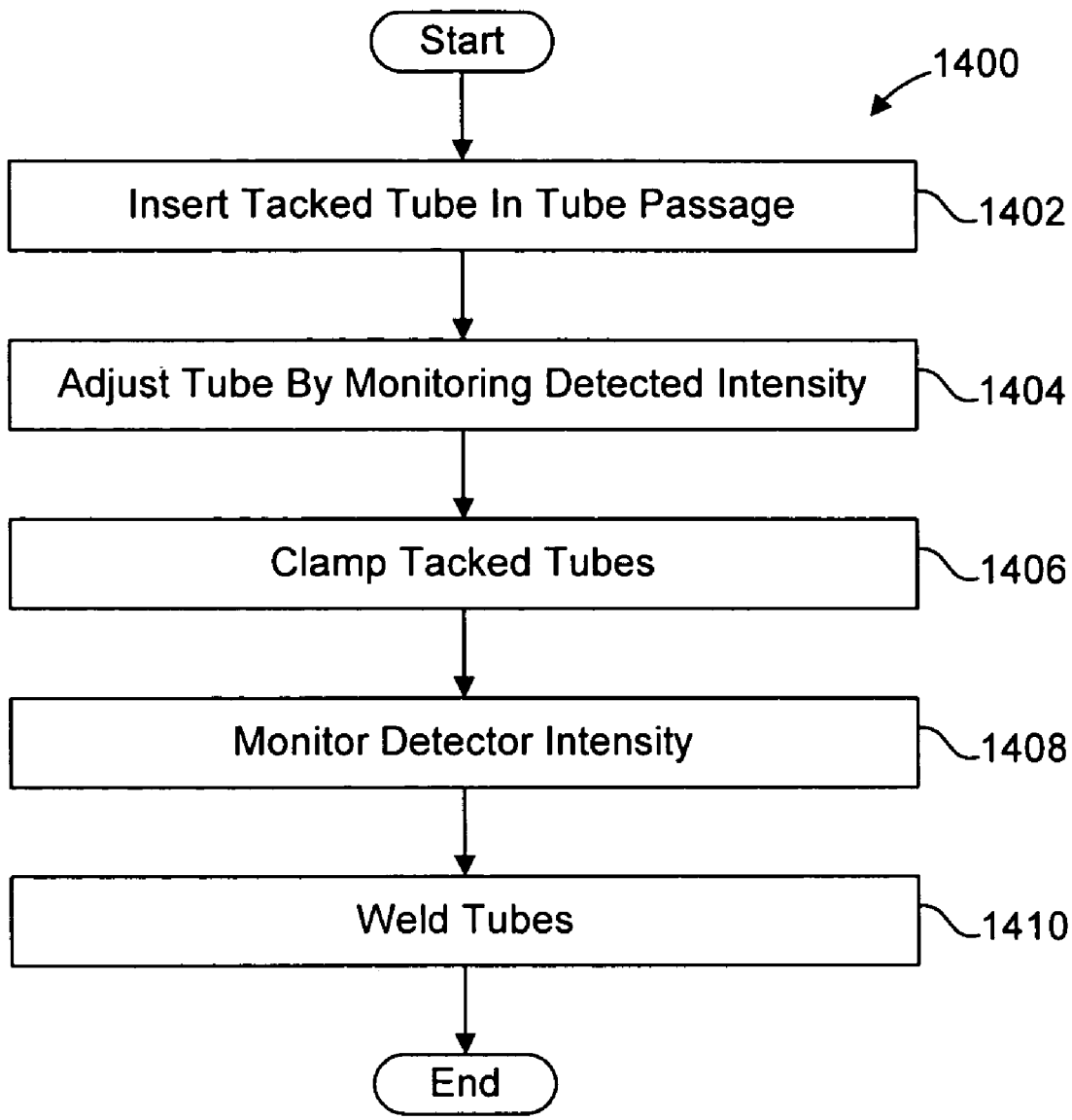
FIG. 14 is a flowchart summarizing one method of using an orbital welder of the present invention to weld two pre-tacked tubes together.

FIG. 14 is a flowchart summarizing one method 1400 of using an orbital welder (e.g., orbital welder 300) of the present invention to weld a pair of pre-tacked tubes together. In a first step 1402, an operator inserts a pre-tacked tube into tube passage 314 of orbital welder 300. In a second step 1404, the welder monitors the intensity of light detected by detector 322 via indicator 326, until the proper intensity (e.g., 80%±2.5% of the emitted intensity) is detected, thereby indicating that the seam of the pre-tacked tubes is properly aligned with weld tip 306. Then, in a third step 1406, the welder clamps the tubes in place by engaging clamps 408 and 410. In fourth step 1408, the welder monitors the intensity of detected light from detector 322, via indicator 326, to make sure that the process of clamping the tubes in place in step 1406 did not create any misalignment of the tube in tube passage 314. Finally, in a fifth step 1410, the operator welds the pre-tacked tubes together by initiating a welding routine of orbital welder 300 to arc-weld the seam of the pre-tacked tubes.

Figure 15:
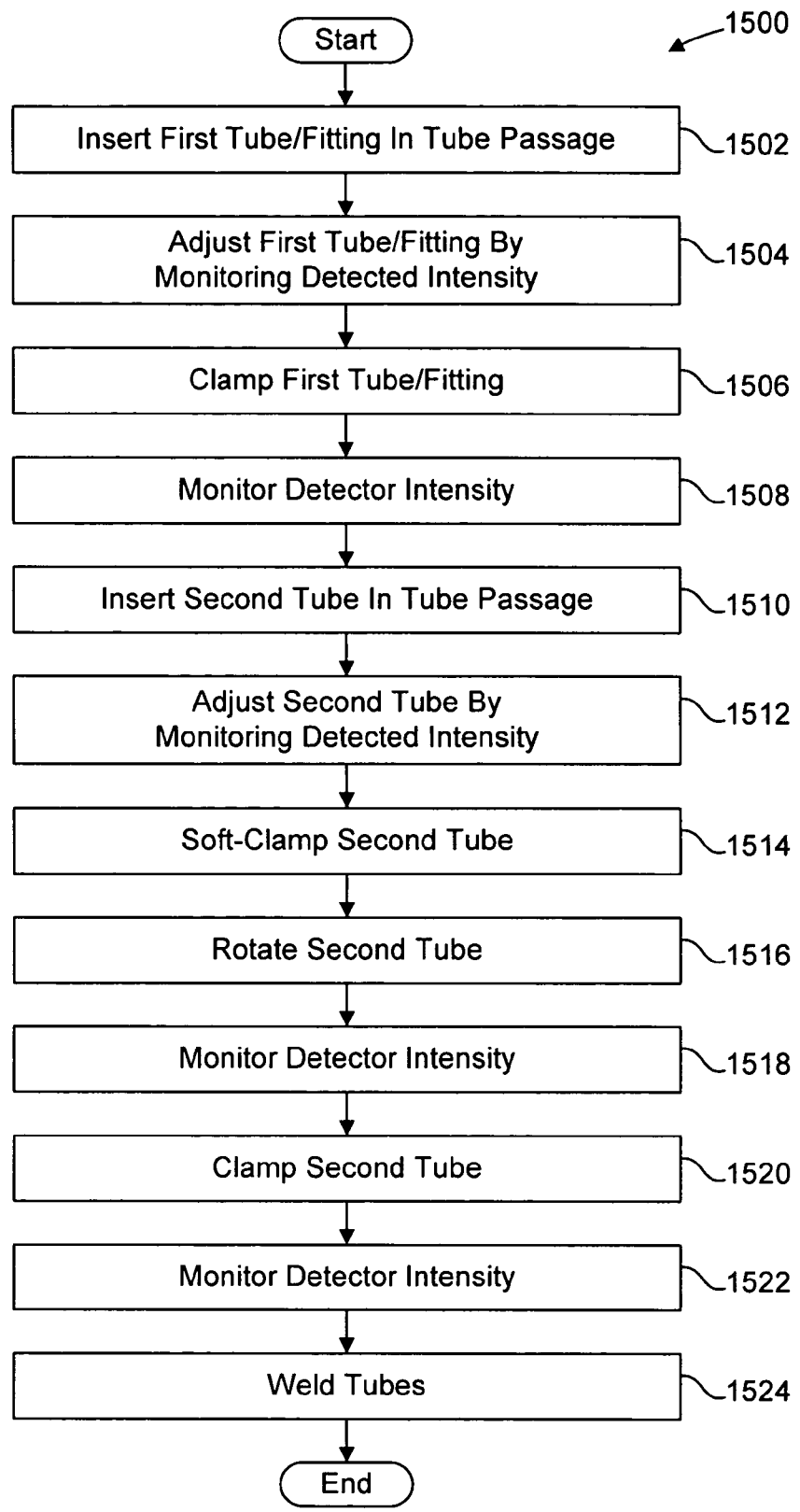
FIG. 15 is a flowchart summarizing one method of using an orbital welder of the present invention to weld two tubes or a tube fitting and a tube together.

FIG. 15 is a flowchart summarizing one method 1500 for welding two tubes together using an orbital welder (e.g., orbital welder 300) of the present invention. In a first step 1502, an operator of orbital welder 300 inserts a first tube 312 (or optionally a tube fitting) into tube passage 314. Then, in a second step 1504, the operator of orbital welder 300 adjusts tube 312 (or the fitting) within tube passage 314 and monitors indicator 326 until indicator 326 indicates that the intensity of light detected by detector 322 is indicative of proper alignment of tube 312 within tube passage 314 (e.g., 50%±2.5% of the maximum reflectance). After tube 312 is aligned, in a third step 1506, the operator engages clamp 408 to retain tube 312 in position. Then, in a fourth step 1508, the operator again monitors the intensity of reflected light monitored by detector 322, via indicator 326, to ensure that the clamping process did not jar tube 312 out of alignment. In a fifth step 1510, the operator inserts second tube 612 into tube passage 314. To ensure proper alignment, in a sixth step 1512, the operator monitors the detected intensity of light received by detector 322 via indicator 326 until the intensity is indicative of the mating end of second tube 612 abutting the mating end of tube 312, thereby forming seam 614. In a seventh step 1514, the operator can "soft-clamp" second tube 612 using clamp 410, such that second tube 612 is retained in position, but can still be rotated. Then, in an eighth step 1516, the operator of welder 300 rotates second tube 612, and in a ninth step 1518, monitors indicator 326 to ensure that the monitored intensity does not deviate beyond a specified range (e.g., 65%–95%) of the maximum reflectance). Note that eighth step 1516 and ninth step 1518 can occur generally simultaneously, or sequentially. If, while rotating second tube 612, the monitored intensity did not deviate from the specified range, the operator fixes second tube 614 in place by completely engaging second clamp 410 in a tenth step 1520. Next, in an eleventh step 1522, the operator again monitors the intensity of reflected light received by detector 322 via indicator 326, to ensure that engaging clamp 410 did not misalign second tube 612. If second tube 612 is still aligned, then in a twelfth step 1524, the operator initiates a welding process of orbital welder 300 to create an arc weld around seam 614 of tube 312 and second tube 612.

The description of particular embodiments of the present invention is now complete. Many of the described features may be substituted, altered or omitted without departing from the scope of the invention. For example, alignment package 314 may be permanently incorporated into body 302, as opposed to being mounted outside body 302 via mounting bracket 328. As another example, the alignment system of the present invention is not limited to orbital welders designed to make flat, circular welds, but could be also be incorporated into orbital welders designed to make "notched-T welds," "oblique end-to-end" welds, or other specific weld types that require exact alignment of tubes and/or fittings. As yet another example, the alignment systems of the present invention can be used with tubes that do not have beveled ends. Further, the reflectance/transmittance percentage ranges set forth herein were found to be suitable for one particular application. It is anticipated however, that these ranges will be slightly modified depending on the particular physical characteristics (e.g., tube composition, etc.) of an application. Such range modifications can be easily determined empirically. These and other modifications will be apparent to those skilled in the art in light of the present disclosure.

I claim:

1. An orbital welder comprising:
    a body defining a tube passage;
    a weld tip;
    a rotor coupled to said weld tip for causing said weld tip to rotate about an axis;
    a light source fixed to said body and disposed to emit light toward said tube passage such that said emitted light will at least partially impinge upon a tube placed in said tube passage;
    a detector fixed to said body and disposed to detect said light emitted by said light source from said tube passage; and
    an indicator; and wherein
    the intensity of said detected light depends on the position of said tube;
    said detector is disposed to detect light reflected by said tube placed in said tube passage; and
    said indicator is operative to indicate
        when the intensity of said detected light is below a first predetermined intensity indicative that a minimum amount of said emitted light is impinging upon said tube,
        when the intensity of said detected light is above a second predetermined intensity indicative that a maximum amount of said emitted light is impinging upon said tube, and
        when the intensity of said detected light has reached a third predetermined intensity indicative of alignment of a mating end of said tube with said weld tip, said third predetermined intensity being greater than said first predetermined intensity and less than said second predetermined intensity.

2. An orbital welder according to claim 1, wherein said light source comprises at least one laser.

3. An orbital welder according to claim 1, wherein said rotor defines an aperture there through.

4. An orbital welder according to claim 3, wherein:
    said light source emits light through said aperture in said rotor toward said tube passage; and said detector detects light from said tube passage through said aperture in said rotor.

5. An orbital welder according to claim 3, wherein:
said rotor defines a second aperture there through; and
said detector detects light passing through said aperture and said second aperture of said rotor.

6. An orbital welder according to claim 1, wherein said tube comprises a tube fitting.

7. An orbital welder according to claim 1, further comprising:
a plurality of light sources, each disposed to emit light toward said tube passage such that said light from at least one of said plurality of light sources will at least partially impinge upon said tube placed in said tube passage; and wherein
said detector is disposed to detect said light emitted by said plurality of light sources.

8. An orbital welder according to claim 1, wherein said first predetermined intensity is no more than 5% of a maximum reflectance value.

9. An orbital welder according to claim 1, wherein said second predetermined intensity is at least 95% of a maximum reflectance value.

10. An orbital welder according to claim 1, wherein said third predetermined intensity is 50% (±2.5%) of a maximum reflectance value.

11. An orbital welder according to claim 1, wherein said indicator is further operative to indicate when the intensity of said detected light has reached a fourth predetermined intensity indicative of alignment of a mating end of a second tube with said mating end of said first tube and said weld tip, said fourth predetermined intensity being greater than said third predetermined intensity and less than said second predetermined intensity.

12. An orbital welder according to claim 11, wherein said fourth predetermined intensity is 80% (±2.5%) of a maximum reflectance value.

13. An orbital welder according to claim 11, wherein said indicator is further operative to indicate when the intensity of said detected light deviates beyond a predetermined range of said fourth predetermined intensity.

14. An orbital welder according to claim 13, wherein said predetermined range is (±20%) of said fourth predetermined intensity.

15. An orbital welder according to claim 1, wherein said intensity of said detected light is indicative of the position of an end of said tube with respect to said weld tip.

16. An orbital welder according to claim 1, wherein:
said tube defines a Z axis; and
said intensity of said detected light is indicative of the axial alignment of a second tube with respect to said Z axis.

17. An orbital welder according to claim 1, wherein said intensity of said detected light is indicative of the ovality of said tube placed in said tube passage.

18. An orbital welder according to claim 1, wherein said light source and said detector are embodied in a single unit.

19. An orbital welder according to claim 1, wherein:
said light source is disposed to emit light in a first direction;
said detector is disposed to detect light along a second direction; and
said first direction and said second direction are adjustable.

20. An orbital welder according to claim 1, wherein said light source is adapted to focus said emitted light to a particular spot size at a point where said emitted light would impinge upon said tube.

21. An orbital welder according to claim 20, wherein said spot size is approximately 50 microns.

22. An orbital welder according to claim 20, wherein the position of said light source is adjustable with respect to said tube passage to facilitate adjustment of said spot size.

23. An orbital welder according to claim 1, wherein said light emitted by said light source partially impinges on an edge of a mating end of said tube placed in said tube passage when said tube is aligned with said weld tip.

24. An orbital welder according to claim 1, further comprising at least one clamp disposed to retain said tube in said tube passage.

25. An orbital welder according to claim 24, wherein said clamp is operative to automatically engage said tube responsive to a predetermined intensity of said detected light.

26. An orbital welder according to claim 1, wherein said indicator is operative to display said intensity of said detected light.

27. An orbital welder according to claim 26, wherein said indicator is further operative to display a target intensity indicative of a target position of said tube in said tube passage.

28. An orbital welder comprising:
a body defining a tube passage;
a weld tip;
a rotor coupled to said weld tip for causing said weld tip to rotate about an axis;
a light source fixed to said body disposed to emit light toward said tube passage such that said emitted light will at least partially impinge upon a tube placed in said tube passage;
a detector fixed to said body and disposed to detect said light emitted by said light source from said tube passage; and
an indicator; and wherein
the intensity of said detected light depends on the position of said tube;
said detector is disposed to detect light transmitted by said light source that could be at least partially blocked by said tube placed in said tube passage; and
said indicator is operative to indicate
when the intensity of said detected light is above a first predetermined intensity indicative of a minimum amount of said emitted light impinging upon said tube,
when the intensity of said detected light is below a second predetermined intensity indicative of a maximum amount of said emitted light impinging upon said tube, and
when the intensity of said detected light has reached a third predetermined intensity indicative of alignment of a mating end of said tube with said weld tip, said third predetermined intensity being greater than said second predetermined intensity and less than said first predetermined intensity.

29. An orbital welder according to claim 28, wherein said light source and said detector are spaced apart from one another on opposite sides of said tube passage.

30. An orbital welder according to claim 28, further comprising:

a plurality of light sources each disposed to emit light toward said tube passage such that said light will at least partially impinge upon said tube placed in said tube passage; and a plurality of detectors each disposed to detect said light emitted by a respective one of said plurality of light sources.

31. An orbital welder according to claim 28, wherein said first predetermined intensity is at least 95% of a maximum transmittance value.

32. An orbital welder according to claim 28, wherein said second predetermined intensity at most 5% of a maximum transmittance value.

33. An orbital welder according to claim 28, wherein said third predetermined intensity is 50% (±2.5%) of a maximum transmittance value.

34. An orbital welder according to claim 28, wherein said indicator is further operative to indicate when the intensity of said detected light has reached a fourth predetermined intensity indicative of alignment of a mating end of a second tube with said mating end of said first tube and said weld tip, said fourth predetermined intensity being greater than said second predetermined intensity and less than said third predetermined intensity.

35. An orbital welder according to claim 34, wherein said fourth predetermined intensity is 20% (±2.5%) of a maximum transmittance value.

36. An orbital welder according to claim 34, wherein said indicator is further operative to indicate when the intensity of said detected light deviates beyond a predetermined range of said fourth predetermined intensity.

37. An orbital welder according to claim 36, wherein said predetermined range is (±20%) of said fourth predetermined intensity.

38. An orbital welder according to claim 28, wherein said light source comprises at least one laser.

39. An orbital welder according to claim 28, wherein said rotor defines an aperture there through.

40. An orbital welder according to claim 39, wherein:
said rotor defines a second aperture there through; and
said detector detects light passing through said aperture and said second aperture of said rotor.

41. An orbital welder according to claim 28, wherein said tube comprises a tube fitting.

42. An orbital welder according to claim 28, wherein said intensity of said detected light is indicative of the position of an end of said tube with respect to said weld tip.

43. An orbital welder according to claim 28, wherein:
said tube defines a Z axis; and
said intensity of said detected light is indicative of the axial alignment of a second tube with respect to said Z axis.

44. An orbital welder according to claim 28, wherein said intensity of said detected light is indicative of the ovality of said tube placed in said tube passage.

45. An orbital welder according to claim 28, wherein said light source is adapted to focus said emitted light to a particular spot size where said emitted light would impinge upon said tube.

46. An orbital welder according to claim 45, wherein said spot size is approximately 50 microns.

47. An orbital welder according to claim 45, wherein the position of said light source is adjustable with respect to said tube passage to facilitate adjustment of said spot size.

48. An orbital welder according to claim 28, wherein said light emitted by said light source partially impinges on an edge of a mating end of said tube placed in said tube passage when said tube is aligned with said weld tip.

49. An orbital welder according to claim 28, further comprising at least one clamp disposed to retain said tube in said tube passage.

50. An orbital welder according to claim 49, wherein said clamp is operative to automatically engage said tube responsive to a predetermined intensity of said detected light.

51. An orbital welder according to claim 28, wherein said indicator is further operative to display a target intensity indicative of a target position of said tube in said tube passage.

52. In an orbital welder having a tube passage, a weld tip, a light source, and a light detector, a method comprising:
emitting light from said light source into said tube passage;
defining a first predetermined intensity indicative of a minimum amount of said emitted light impinging on a tube in said tube passage;
defining a second predetermined intensity indicative of a maximum amount of light impinging on said tube in said tube passage;
defining a third predetermined intensity indicative of the alignment of a mating end of said tube with said weld tip, said third predetermined intensity between said first and said second predetermined intensities;
monitoring light from said tube passage with said detector; and
providing a signal when the intensity of light monitored by said detector is within a predetermined range of said third predetermined intensity.

53. A method according to claim 52, wherein said step of emitting light from said light source includes emitting light from at least one laser.

54. A method according to claim 52, wherein:
said orbital welder further includes a rotor defining an aperture there through; and
said step of emitting light into said tube passage includes emitting light through said aperture in said rotor.

55. A method according to claim 54, wherein said step of monitoring light from said tube passage includes monitoring light reflected by said tube disposed in said tube passage.

56. A method according to claim 54, wherein said step of monitoring light from said tube passage includes monitoring light transmitted through said tube passage.

57. A method according to claim 56, wherein:
said rotor defines a second aperture there through; and
said step of monitoring light passing through said tube passage includes monitoring light passing through said second aperture of said rotor.

58. A method according to claim 52, wherein said step of monitoring light from said tube passage includes monitoring light reflected by said tube disposed in said tube passage.

59. A method according to claim 52, wherein said step of monitoring light from said tube passage includes monitoring light transmitted through said tube passage.

60. A method according to claim 52, wherein:
said third predetermined intensity is indicative of a seam of a pre-tacked pair of tubes being aligned with said weld tip.

61. A method according to claim 52, further comprising:
defining a fourth predetermined intensity indicative of a second tube abutting said tube disposed in said tube passage; and
providing a second signal when the intensity of light monitored by said detector is within a predetermined range of said fourth predetermined intensity.

62. A method according to claim 61, further comprising:
monitoring light from said tube passage with said detector while said second tube is rotated; and
providing a third signal if the intensity of said monitored light deviates from a second predetermined range of said fourth predetermined intensity while said second tube is rotated.

63. A method according to claim 62, wherein said second predetermined range is (±20%) of said fourth predetermined intensity.

64. A method according to claim 52, wherein said tube comprises a tube fitting.

65. A method for aligning at least one tube in an orbital welder, said method comprising:
providing an orbital welder including a body defining a tube passage, a weld tip, a rotor coupled to said weld tip for causing said weld tip to rotate about an axis, a light source fixed to said body disposed to emit light toward said tube passage such that said emitted light will at least partially impinge upon a tube placed in said tube passage, and a detector fixed to said body disposed to detect said light emitted by said light source;
defining a first predetermined intensity indicative of a minimum amount of said emitted light impinging on a tube in said tube passage;
defining a second predetermined intensity indicative of a maximum amount of light impinging on said tube in said tube passage;
defining a third predetermined intensity indicative of the alignment of a mating end of said tube with said weld tip, said third predetermined intensity between said first and said second predetermined intensities;
monitoring the intensity of said emitted light; and
manipulating said tube in said tube passage until said intensity of said emitted light is equal to said third predetermined intensity.

* * * * *